United States Patent
Czajkowski

(10) Patent No.: US 9,485,229 B2
(45) Date of Patent: Nov. 1, 2016

(54) OBJECT LEVEL ENCRYPTION SYSTEM INCLUDING ENCRYPTION KEY MANAGEMENT SYSTEM

(71) Applicant: David R. Czajkowski, Encinitas, CA (US)

(72) Inventor: David R. Czajkowski, Encinitas, CA (US)

(73) Assignee: Space Micro, Inc., San Diego, CA (US)

( * ) Notice: Subject to any disclaimer, the term of this patent is extended or adjusted under 35 U.S.C. 154(b) by 5 days.

(21) Appl. No.: 14/551,081

(22) Filed: Nov. 24, 2014

(65) Prior Publication Data

US 2015/0200919 A1    Jul. 16, 2015

Related U.S. Application Data

(60) Provisional application No. 61/908,580, filed on Nov. 25, 2013.

(51) Int. Cl.
*H04L 9/32* (2006.01)
*H04L 29/06* (2006.01)

(52) U.S. Cl.
CPC ......... *H04L 63/0435* (2013.01); *H04L 63/061* (2013.01); *H04L 63/0892* (2013.01)

(58) Field of Classification Search
CPC ............................. H04L 9/08; H04L 63/061
USPC ......................................................... 713/171
See application file for complete search history.

(56) References Cited

U.S. PATENT DOCUMENTS

2010/0191959 A1*   7/2010   Czajkowski ............ G06F 21/14
                                                                       713/155

* cited by examiner

*Primary Examiner* — Anthony Brown
(74) *Attorney, Agent, or Firm* — Continuum Law; Robert P. Cogan

(57) ABSTRACT

A symmetric PGP encrypted communications path is provided in which the recipient may be identified with only publicly available information. Data to be encrypted is encrypted at the object level. Encryption keys for both the transmitter and receiver are sent to a security server. Data received from the transmitter includes intended receiver ID. The receiver includes its actual ID. The received ID and the actual ID are sent to the security server for authentication. If authentication succeeds, the security server sends a session key to the receiver, and the receiver can use its own key to decrypt data. The system reacts to authentication failure by disabling decryption in the receiver and may also take countermeasures.

12 Claims, 21 Drawing Sheets

| Protection Variable | Location Used | Plaintext or Encrypt | Encryption Key | Protection Value |
|---|---|---|---|---|
| TRANSMITTER E-MAIL ADDRESS | HEADER-Tx | PLAINTEXT | NA | ENCRYPTION KEY INDEX |
| TRANSMITTER E-MAIL ADDRESS | HEADER-Tx | ENCRYPT | TRANSMITTER'S | TRANSMITTER AUTHENTICATION |
| TRANSMITTER PHONE NUMBER | HEADER-Tx | PLAINTEXT | NA | ENCRYPTION KEY INDEX |
| TRANSMITTER IP ADDRESS | HEADER-Tx | PLAINTEXT | NA | ENCRYPTION KEY INDEX |
| TRANSMITTER PUBLIC ID (OTHER TYPE) | HEADER-Tx | PLAINTEXT | NA | ENCRYPTION KEY INDEX |
| TRANSMITTER PASSWORD | HEADER-Tx | ENCRYPT | TRANSMITTER'S | TRANSMITTER AUTHENTICATION |
| TRANSMITTER BIOMETRIC | HEADER-Tx | ENCRYPT | TRANSMITTER'S | TRANSMITTER AUTHENTICATION |
| ADMINISTRATOR E-MAIL ADDRESS | HEADER-Tx | ENCRYPT | TRANSMITTER'S | SECURE ACCESS CONTROL LIST |
| DATA TITLE | HEADER-Tx | ENCRYPT | TRANSMITTER'S | DATA AUTHENTICATION |
| DATA SERIAL NUMBER | HEADER-Tx | ENCRYPT | TRANSMITTER'S | DATA AUTHENTICATION |
| DATA AUTHOR | HEADER-Tx | ENCRYPT | TRANSMITTER'S | DATA AUTHENTICATION |
| DATA VERSION NUMBER | HEADER-Tx | ENCRYPT | TRANSMITTER'S | DATA AUTHENTICATION |
| RECEIVER E-MAIL ADDRESS | HEADER-Tx | ENCRYPT | TRANSMITTER'S | SECURE ACCESS CONTROL LIST |
| RECEIVER E-MAIL ADDRESS | HEADER-Rx | ENCRYPT | RECEIVER'S | RECEIVER AUTHENTICATION |
| RECEIVER E-MAIL ADDRESS | HEADER-Rx | PLAINTEXT | NA | ENCRYPTION KEY INDEX |
| RECEIVER PHONE NUMBER | HEADER-Tx | PLAINTEXT | NA | ENCRYPTION KEY INDEX |
| RECEIVER IP ADDRESS | HEADER-Tx | PLAINTEXT | NA | ENCRYPTION KEY INDEX |
| RECEIVER PUBLIC ID (OTHER TYPE) | HEADER-Tx | PLAINTEXT | NA | ENCRYPTION KEY INDEX |
| RECEIVER PASSWORD | HEADER-Rx | ENCRYPT | RECEIVER'S | RECEIVER AUTHENTICATION |
| RECEIVER BIOMETRIC | HEADER-Rx | ENCRYPT | RECEIVER'S | RECEIVER AUTHENTICATION |
| ADMINISTRATOR E-MAIL ADDRESS | HEADER-Rx | ENCRYPT | ADMIN'S | ADMINISTRATOR AUTHENTICATION |
| ADMINISTRATOR E-MAIL ADDRESS | HEADER-Rx | PLAINTEXT | NA | ENCRYPTION KEY INDEX |
| ADMINISTRATOR PASSWORD | HEADER-Rx | ENCRYPT | ADMIN'S | ADMINISTRATOR AUTHENTICATION |
| ADMINISTRATOR BIOMETRIC | HEADER-Rx | ENCRYPT | ADMIN'S | ADMINISTRATOR AUTHENTICATION |
| RECEIVER'S GROUP E-MAIL ADDRESS OR NAME | HEADER-Tx | ENCRYPT | TRANSMITTER'S | SECURE ACCESS CONTROL LIST |
| RECEIVER'S GROUP PROCESSOR ID OR IP ADDRESS | HEADER-Tx | ENCRYPT | TRANSMITTER'S | SECURE ACCESS CONTROL LIST |
| RECEIVER'S GROUP PUBLIC ID NAME | HEADER-Tx | ENCRYPT | TRANSMITTER'S | SECURE ACCESS CONTROL LIST |
| ADMIN'S GROUP E-MAIL ADDRESS OR NAME | HEADER-Tx | ENCRYPT | TRANSMITTER'S | SECURE ACCESS CONTROL LIST |
| ADMIN'S GROUP PROCESSOR ID OR IP ADDRESS | HEADER-Tx | ENCRYPT | TRANSMITTER'S | SECURE ACCESS CONTROL LIST |
| RECEIVER'S PROCESSOR ID OR IP ADDRESS | HEADER-Tx | ENCRYPT | TRANSMITTER'S | SECURE ACCESS CONTROL LIST |
| RECEIVER'S PROCESSOR ID OR IP ADDRESS | HEADER-Rx | ENCRYPT | RECEIVER'S | RECEIVER AUTHENTICATION |
| RECEIVER'S PROCESSOR ID OR IP ADDRESS | HEADER-Rx | ENCRYPT | PROCESSOR'S | RECEIVER PROCESSOR AUTHENTICATION |
| TRANSMITTER'S PROCESSOR ID OR IP ADDRESS | HEADER-Tx | ENCRYPT | TRANSMITTER'S | TRANSMITTER PROCESSOR AUTHENTICATION |
| ADMINISTRATION PROCESSOR ID OR IP ADDRESS | HEADER-Tx | ENCRYPT | TRANSMITTER'S | SECURE ACCESS CONTROL LIST |
| ADMINISTRATION PROCESS ID OR IP ADDRESS | ADMIN HEADER | ENCRYPT | ADMIN'S | ADMIN PROCESSOR AUTHENTICATION |
| DATE/TIME SOFTWARE ACCESS OK | HEADER-Tx | ENCRYPT | TRANSMITTER'S | SECURE ACCESS TIME AVAILABLE |
| DATE/TIME OF REQUEST | HEADER-Rx | ENCRYPT | RECEIVER'S | SECURE ACCESS TIME REQUESTED |
| DATA HASH (CHECKSUM) | HEADER-Tx | ENCRYPT | TRANSMITTER'S | DATA INTEGRITY VERIFICATION |
| TRANSMITTER HEADER HASH (CHECKSUM) | HEADER-Tx | ENCRYPT | TRANSMITTER'S | HEADER INTEGRITY VERIFICATION |
| ADMIN HEADER HASH (CHECKSUM) | HEADER-Tx | ENCRYPT | ADMIN'S | HEADER INTEGRITY VERIFICATION |
| DATA HASH VALUE | HEADER-Tx | ENCRYPT | TRANSMITTER'S | DATA INTEGRITY VERIFICATION |
| TRANSMITTER HEADER HASH VALUE | HEADER-Tx | ENCRYPT | TRANSMITTER'S | HEADER INTEGRITY VERIFICATION |
| RECEIVER HEADER HASH VALUE | HEADER-Rx | ENCRYPT | RECEIVER'S | HEADER INTEGRITY VERIFICATION |
| ADMIN HEADER HASH VALUE | ADMIN HEADER | ENCRYPT | ADMIN'S | HEADER INTEGRITY VERIFICATION |

FIG. 17

| | 1002 | 1030 | 1040 | 1060 |
|---|---|---|---|---|
| | DETECTION CATEGORY | DETECTION VARIABLE | LOCATED IN | DOES NOT MATCH |
| 1006 | TRANSMITTER ERRORS | TRANSMITTER E-MAIL | SOURCE HEADER | DATA ID# |
| 1008 | | TRANSMITTER E-MAIL | SOURCE HEADER | TRANSMITTER PASSWORD |
| | | TRANSMITTER E-MAIL | SOURCE HEADER | TRANSMITTER BIOMETRIC |
| | ADMINISTRATOR ERRORS | ADMINISTRATOR'S E-MAIL | ADMIN HEADER | DATA ID# |
| | | ADMINISTRATOR'S E-MAIL | ADMIN HEADER | ADMIN PASSWORD |
| | | ADMINISTRATOR'S E-MAIL | ADMIN HEADER | ADMIN BIOMETRIC |
| | | ADMINISTRATOR'S E-MAIL | ADMIN HEADER | ADMIN GROUP ID |
| 1010 | | ADMINISTRATOR'S E-MAIL | ADMIN HEADER | ADMIN'S E-MAIL |
| | RECEIVER ERRORS | RECEIVER'S E-MAIL | RECEIVER HEADER | DATA ID# |
| | | RECEIVER'S E-MAIL | RECEIVER HEADER | RECEIVER PASSWORD |
| | | RECEIVER'S E-MAIL | RECEIVER HEADER | RECEIVER BIOMETRIC |
| | | RECEIVER'S E-MAIL | RECEIVER HEADER | RECEIVER GROUP ID |
| | | RECEIVER'S E-MAIL | RECEIVER HEADER | RECEIVER GROUP ID |
| 1012 | | RECEIVER'S E-MAIL | RECEIVER HEADER | RECEIVER'S E-MAIL |
| | PROCESSOR | TRANSMITTER E-MAIL-ID | SOURCE HEADER | TRANSMITTER PROCESSOR ID |
| | | RECEIVER'S E-MAIL-ID | SOURCE HEADER | RECEIVER PROCESSOR ID |
| | | RECEIVER'S E-MAIL-ID | RECEIVER HEADER | RECEIVER PROCESSOR ID |
| | | RECEIVER'S E-MAIL-ID | SOURCE HEADER | RECEIVER GROUP PROCESSOR ID |
| | | RECEIVER'S E-MAIL-ID | RECEIVER HEADER | RECEIVER GROUP PROCESSOR ID |
| | | ADMIN'S E-MAIL-ID | SOURCE HEADER | ADMIN PROCESSOR ID |
| | | ADMIN'S E-MAIL-ID | ADMEN HEADER | ADMIN PROCESSOR ID |
| | | ADMIN'S E-MAIL-ID | SOURCE HEADER | ADMIN GROUP PROCESSOR ID |
| | | ADMIN'S E-MAIL-ID | ADMIN HEADER | ADMIN GROUP PROCESSOR ID |
| | | ADMIN'S PROCESSOR ID | SOURCE HEADER | DATA ID# |
| 1014 | | ADMIN'S PROCESSOR ID | ADMIN HEADER | DATA ID# |
| | ACCESS TIME | DATE/TIME OF REQUEST | ADMIN HEADER | DATE/TIME SOFTWARE ACCESS OK |
| 1016 | | DATE/TIME OF REQUEST | RECEIVER HEADER | DATE/TIME SOFTWARE ACCESS OK |
| | SOFTWARE INTEGRITY | DATA HASH (CHECKSUM) | SOURCE HEADER | DATA HASH (CHECKSUM) |
| 1018 | | DATA HASH (CHECKSUM) | ADMEN HEADER | DATA HASH (CHECKSUM) |
| | HEADER INTEGRITY | TRANSMITTER HEADER HASH (CHECKSUM) | SOURCE HEADER | TRANSMITTER HEADER HASH (CHECKSUM) |
| | | ADMIN HEADER HASH (CHECKSUM) | ADMIN HEADER | ADMIN HEADER HASH (CHECKSUM) |
| | | RECEIVER HEADER HASH VALUE | RECEIVER HEADER | RECEIVER HEADER HASH VALUE |

1000

DETECT: COMPONENT FAILURES
DETECT: SYSTEM FAILURES
DETECT: ATTACK BY MALICIOUS SOFTWARE
DETECT: SUSPICIOUS MODIFICATION OF FILES
DETECT: DISTINGUISH INTRUSION ATTACK FROM OUTSIDE VS. INSIDE
TIME STAMP AND MACHINE ID IN HEADERS SO CAN TRACK THEM
DETECT: SUSPICIOUS PATTERNS OF ACCESS ATTEMPTS

FIG. 19A

| RESPONSE FROM CATEGORY LOCATION | ERROR CONDITION |
|---|---|
| DATA APPROVAL LIST | TRANSMITTER DOES NOT HAVE ACCESS TO THIS DATA |
| SOURCE HEADER | FALSE TRANSMITTER OR ACCESS ATTEMPT |
| SOURCE HEADER | FALSE TRANSMITTER OR ACCESS ATTEMPT |
| SOFTWARE APPROVAL LIST | ADMINISTRATOR DOES NOT HAVE ACCESS TO THIS DATA |
| ADMIN HEADER | FALSE ADMINISTRATOR OR ACCESS ATTEMPT |
| ADMIN HEADER | FALSE ADMINISTRATOR OR ACCESS ATTEMPT |
| SOURCE HEADER | ADMINISTRATOR DOES NOT HAVE ACCESS TO THIS SOFTWARE |
| SOURCE HEADER | FALSE ADMINISTRATOR OR ACCESS ATTEMPT |
| SOFTWARE APPROVAL LIST | RECEIVER DOSE NOTE HAVE ACCESS TO THIS DATA |
| RECEIVER HEADER | FALSE RECEIVER OR ACCESS ATTEMPT |
| RECEIVER HEADER | FALSE RECEIVER OR ACCESS ATTEMPT |
| SOURCE HEADER | RECEIVER DOES NOT HAVE ACCESS TO THIS SOFTWARE OR FALSE RECEIVER/ACCESS ATTEMPT |
| ADMIN HEADER | RECEIVER DOSE NOT HAVE ACCESS TO THIS SOFTWARE |
| SOURCE HEADER | FALSE RECEIVER OR ACCESS ATTEMPT |
| SOURCE HEADER | TRANSMITTER NOT USING CORRECT COMPUTER OR SOFTWARE ACCESS COMPROMISED |
| RECEIVER HEADER | RECEIVER NOT ON CORRECT COMPUTER OR FALSE RECEIVER |
| RECEIVER HEADER | RECEIVER NOT ON CORRECT COMPUTER OR FALSE RECEIVER |
| SOURCE HEADER | TRANSMITTER DOES NOT HAVE A CORRECT COMPUTER/GROUP ID LIST |
| RECEIVER HEADER | RECEIVER IS USING THE WRONG COMPUTER OR FALSE RECEIVER |
| SOURCE HEADER | TRANSMITTER DOES NOT HAVE CORRECT COMPUTER/GROUP ID LIST |
| ADMIN HEADER | ADMIN NOT ON CORRECT COMPUTER OR FALSE ADMINISTRATOR |
| SOURCE HEADER | TRANSMITTER DOES NOT HAVE CORRECT COMPUTER/GROUP ID LIST |
| ADMIN HEADER | ADMIN NOT ON CORRECT COMPUTER OR FALSE ADMINISTRATOR |
| SOURCE HEADER | TRANSMITTER DOES NOT HAVE CORRECT COMPUTER/ADMIN ID LIST |
| SOFTWARE APPROVAL LIST | ADMIN NOT ON CORRECT COMPUTER OR FALSE ADMINISTRATOR |
| SOURCE HEADER | ADMIN REQUESTING SOFTWARE OUTSIDE OF ACCEPTABLE TIME PERIOD |
| SOURCE HEADER | RECEIVER REQUESTING SOFTWARE OUTSIDE OF ACCEPTABLE TIME PERIOD |
| CLIENT UN-WRAPPER MODULE | DATA HAS BEEN TAMPERED |
| CLIENT UN-WRAPPER MODULE | DATA HAS BEEN TAMPERED |
| CASS Tx HASH CALCULATION | HEADER TAMPERING OR FALSE TRANSMITTER |
| CASS ADMIN HASH CALCULATION | HEADER TAMPERING OR FALSE ADMINISTRATOR |
| CASS Rx HASH CALCULATION | HEADER TAMPERING OR FALSE RECEIVER |

FIG. 19B

| | 1002 | 1030 | 1040 | 1060 |
|---|---|---|---|---|
| | DETECTION CATEGORY | DETECTION VARIABLE | LOCATED IN | DOES NOT MATCH |
| 1006 | TRANSMITTER ERRORS | TRANSMITTER E-MAIL | SOURCE HEADER | DATA ID# |
| | | TRANSMITTER E-MAIL | SOURCE HEADER | TRANSMITTER PASSWORD |
| 1008 | | TRANSMITTER E-MAIL | SOURCE HEADER | TRANSMITTER BIOMETRIC |
| | ADMINISTRATOR ERRORS | ADMINISTRATOR'S E-MAIL | ADMIN HEADER | DATA ID# |
| | | ADMINISTRATOR'S E-MAIL | ADMIN HEADER | ADMIN PASSWORD |
| | | ADMINISTRATOR'S E-MAIL | ADMIN HEADER | ADMIN BIOMETRIC |
| | | ADMINISTRATOR'S E-MAIL | ADMIN HEADER | ADMIN GROUP ID |
| 1010 | | ADMINISTRATOR'S E-MAIL | ADMIN HEADER | ADMIN'S E-MAIL |
| | RECEIVER ERRORS | RECEIVER'S E-MAIL | RECEIVER HEADER | DATA ID# |
| | | RECEIVER'S E-MAIL | RECEIVER HEADER | RECEIVER PASSWORD |
| | | RECEIVER'S E-MAIL | RECEIVER HEADER | RECEIVER BIOMITRIC |
| | | RECEIVER'S E-MAIL | RECEIVER HEADER | RECEIVER GROUP ID |
| | | RECEIVER'S E-MAIL | RECEIVER HEADER | RECEIVER GROUP ID |
| 1012 | | RECEIVER'S E-MAIL | RECEIVER HEADER | RECEIVER'S E-MAIL |
| | PROCESSOR | TRANSMITTER E-MAIL-ID | SOURCE HEADER | TRANSMITTER PROCESSOR ID |
| | | RECEIVER'S E-MAIL-ID | SOURCE HEADER | RECEIVER PROCESSOR ID |
| | | RECEIVER'S E-MAIL-ID | RECEIVER HEADER | RECEIVER PROCESSOR ID |
| | | RECEIVER'S E-MAIL-ID | SOURCE HEADER | RECEIVER GROUP PROCESSOR ID |
| | | RECEIVER'S E-MAIL-ID | RECEIVER HEADER | RECEIVER GROUP PROCESSOR ID |
| | | ADMIN'S E-MAIL-ID | SOURCE HEADER | ADMIN PROCESSOR ID |
| | | ADMIN'S E-MAIL-ID | ADMEN HEADER | ADMIN PROCESSOR ID |
| | | ADMIN'S E-MAIL-ID | SOURCE HEADER | ADMIN GROUP PROCESSOR ID |
| | | ADMIN'S E-MAIL-ID | ADMIN HEADER | ADMIN GROUP PROCESSOR ID |
| | | ADMIN'S PROCESSOR ID | SOURCE HEADER | DATA ID# |
| 1014 | | ADMIN'S PROCESSOR ID | ADMIN HEADER | DATA ID# |
| | ACCESS TIME | DATE/TIME OF REQUEST | ADMIN HEADER | DATE/TIME SOFTWARE ACCESS OK |
| 1016 | | DATE/TIME OF REQUEST | RECEIVER HEADER | DATE/TIME SOFTWARE ACCESS OK |
| | SOFTWARE INTEGRITY | DATA HASH (CHECKSUM) | SOURCE HEADER | DATA HASH (CHECKSUM) |
| 1018 | | DATA HASH (CHECKSUM) | ADMEN HEADER | DATA HASH (CHECKSUM) |
| | HEADER INTEGRITY | TRANSMITTER HEADER HASH (CHECKSUM) | SOURCE HEADER | TRANSMITTER HEADER HASH (CHECKSUM) |
| | | ADMIN HEADER HASH (CHECKSUM) | ADMIN HEADER | ADMIN HEADER HASH (CHECKSUM) |
| | | RECEIVER HEADER HASH VALUE | RECEIVER HEADER | RECEIVER HEADER HASH VALUE |

DETECT: COMPONENT FAILURES
DETECT: SYSTEM FAILURES
DETECT: ATTACK BY MALICIOUS SOFTWARE
DETECT: SUSPICIOUS MODIFICATION OF FILES
DETECT: DISTINGUISH INTRUSION ATTACK FROM OUTSIDE VS. INSIDE
TIME STAMP AND MACHINE ID IN HEADERS SO CAN TRACK THEM
DETECT: SUSPICIOUS PATTERNS OF ACCESS ATTEMPTS

FIG. 20A

| REACTION "MILD" | REACTION "MID" | REACTION "SEVERE" |
|---|---|---|
| NOTIFY ADMIN | HALT TRANSMITTER'S ACCOUNT | FREEZE DATA ACCESS FOR ALL ACCOUNTS |
| NOTIFY ADMIN OR TRANSMITTER | ALLOW 3 FAILED ATTEMPTS, THEN HALT TRANSMITTER'S ACCOUNT | FREEZE TRANSMITTER ACCOUNT |
| NOTIFY ADMIN OR TRANMITTER | ALLOW 3 FAILED ATTEMPTS, THEN HALT TRANSMITTER'S ACCOUNT | FREEZE TRANSMITTER ACCOUNT |
| NOTIFY SECOND ADMIN PERSON | FREEZE ADMIN'S ACCESS TO DATA | FREEZE DATA ACCESS FOR ALL ACCOUNTS |
| NOTIFY SECOND ADMIN PERSON | ALLOW 3 FAILED ATTEMPTS, THEN HALT ADMIN'S ACCOUNT | FREEZE ADMIN'S ACCOUNT |
| NOTIFY SECOND ADMIN PERSON | ALLOW 3 FAILED ATTEMPTS, THEN HALT ADMIN'S ACCOUNT | FREEZE ADMIN'S ACCOUNT |
| NOTIFY SECOND ADMIN PERSON | FREEZE ADMIN'S ACCESS TO DATA | FREEZE ADMIN'S ACCOUNT |
| NOTIFY SECOND ADMIN PERSON | FREEZE ADMIN'S ACCESS TO DATA | FREEZE ADMIN'S ACCOUNT |
| NOTIFY ADMIN | HALT RECEIVER'S ACCOUNT | FREEZE DATA ACCESS FOR ALL ACCOUNTS |
| NOTIFY ADMIN OR RECEIVER | ALLOW 3 FAILED ATTEMPTS, THEN HALT RECEIVER'S ACCOUNT | FREEZE RECEIVER ACCOUNT |
| NOTIFY ADMIN OR RECEIVER | ALLOW 3 FAILED ATTEMPTS, THEN HALT RECEIVER'S ACCOUNT | FREEZE RECEIVER ACCOUNT |
| NOTIFY ADMIN OR RECEIVER | HALT RECEIVER'S ACCOUNT | FREEZE DATA ACCESS FOR ALL ACCOUNTS |
| NOTIFY ADMIN OR RECEIVER | HALT RECEIVER'S ACCOUNT | FREEZE DATA ACCESS FOR ALL ACCOUNTS |
| NOTIFY ADMIN | FREEZE RECEIVER'S ACCESS TO DATA | FREEZE RECEIVER ACCOUNT |
| NOTIFY ADMIN OR TRANSMITTER | HALT TRANSMITTER'S ACCOUNT | FREEZE DATA ACCESS FOR ALL ACCOUNTS |
| NOTIFY ADMIN OR RECEIVER | HALT RECEIVER'S ACCOUNT | FREEZE DATA ACCESS FOR ALL ACCOUNTS |
| NOTIFY ADMIN OR RECEIVER | HALT RECEIVER'S ACCOUNT | FREEZE DATA ACCESS FOR ALL ACCOUNTS |
| PROVIDE ERROR MESSAGE | HALT TRANSMITTER'S ACCOUNT | FREEZE DATA ACCESS FOR ALL ACCOUNTS |
| NOTIFY ADMIN OR RECEIVER | HALT RECEIVER'S ACCOUNT | FREEZE DATA ACCESS FOR ALL ACCOUNTS |
| PROVIDE ERROR MESSAGE TO Tx | HALT TRANSMITTER'S ACCOUNT | FREEZE DATA ACCESS FOR ALL ACCOUNTS |
| NOTIFY SECOND ADMIN | FREEZE ADMIN'S ACCESS TO DATA | FREEZE ADMIN'S ACCOUNT |
| PROVIDE ERROR MESSAGE TO Tx | HALT TRANSMITTER'S ACCOUNT | FREEZE DATA ACCESS FOR ALL ACCOUNTS |
| NOTIFY SECOND ADMIN | FREEZE ADMIN'S ACCESS TO DATA | FREEZE ADMIN'S ACCOUNT |
| PROVIDE ERROR MESSAGE | HALT TRANSMITTER'S ACCOUNT | FREEZE DATA ACCESS FOR ALL ACCOUNTS |
| NOTIFY SECOND ADMIN | FREEZE ADMIN'S ACCESS TO DATA | FREEZE ADMIN'S ACCOUNT |
| PROVIDE ERROR MESSAGE | NOTIFY SECOND ADMIN | FREEZE DATA ACCESS TO ADMIN |
| PROVIDE ERROR MESSAGE | NOTIFY ADMIN | FREEZE DATA ACCESS TO RECEIVER |
| NOTIFY TRANSMITTER | NOTIFY ADMIN | FREEZE DATA ACCESS TO RECEIVER |
| NOTIFY TRANSMITTER | NOTIFY ADMIN | FREEZE DATA ACCESS TO RECEIVER |
| NOTIFY TRANSMITTER | NOTIFY ADMIN | FREEZE DATA ACCESS TO TRANSMITTER |
| NOTIFY ADMIN | NOTIFY SECOND ADMIN | FREEZE DATA ACCESS FOR ALL ACCOUNTS |
| NOTIFY RECEIVER | NOTIFY ADMIN | FREEZE DATA ACCESS TO RECEIVER |

FIG. 20B

OBJECT LEVEL ENCRYPTION SYSTEM INCLUDING ENCRYPTION KEY MANAGEMENT SYSTEM

CROSS REFERENCE TO RELATED APPLICATIONS

This patent application claims priority from Provisional Patent Application Ser. No. 61/908,580 entitled Encryption and Security Policy System, filed Nov. 25, 2013. The contents of this provisional patent application are fully incorporated herein by reference.

FIELD OF THE INVENTION

The present subject matter relates generally to security of data in motion and data at rest, and more particularly to a system which may perform encryption/decryption key registration, key distribution, authentication, and execution of a selectable response to success or failure of authentication.

BACKGROUND

Very widely used forms of encryption use a key to encrypt data prior to transmission. Another key is used by the recipient to decrypt the data. Encryption may be symmetrical in which the sender and receiver exchange a key. However, it is difficult to provide a safe, robust system due to the inherent difficulty of creating, transferring, managing, storing, authenticating, revoking encryption keys, and revoking access to encrypted data once the encrypted data has been distributed. The complexity is compounded as the number of users and access points increases.

Encryption keys must be distributed. In various systems, methods of registering encryption keys and client identity are provided. A means for distributing encryption keys to other clients is established. A common method is Pretty Good Privacy (PGP). In this method, clients log onto their public server and register their encryption keys. However, such a system is subject to registration of the key for a particular client by a non-authorized third party. This is referred to as a spoof.

Authentication of keys is essential. In order to prevent spoofs, a Certificate Authority (CA) creates a digital certificate which is used to establish the authenticity of an individual client or system. The CA is a trusted third party. The CA creates a digital certificate and digitally signs it using the CA's private key. The CA uses an industry standard, e.g., an X.509 certificate. This certificate comprises a data structure in a public key system to uniquely associate a particular entity with a particular public key. Such a system provides a reasonable level of protection. However, the certificate system is very difficult to manage and to administer.

Since the system is focused on uniquely associating one entity with one key, simple and easy methods for "grouping" of encryption keys are not available in order to allow more than two users to share encrypted data. Another desired capability is the ability to provide a different level of access to different ones of multiple users, i.e., multi-level security.

Existing systems do not provide for an action to take in response to unauthorized attempts at access to encrypted data. The systems are also limited in the proactive steps they can take in response to further unauthorized access attempts.

Various disadvantages in communications have been addressed in part. However, a solution has not been provided to address provision of a comprehensive system in encryption networks utilizing keys.

For example, United States Patent Application Publication No. 2014/0169567 discloses granting access to a plurality of devices to a local area network with a single cryptographic key. However, in use of the key, the key is converted from digital form to graphic form when being transferred to an operating device. This does not provide for condition-responsive changes to access the network.

United States Patent Application Publication No. 2014/0003608 discloses a system in which an administrator may generate key managers. Key request users may be linked to particular cryptographic keys. The cryptographic keys may be stored on key exchange servers separate from the key management server. Responsive to a request for a cryptographic key, the key exchange servers may authenticate the key request user associated with the request. However, means are not provided for changing a key in response to predefined circumstances.

United States Patent Application Publication No. 2013/0272524 discloses a system in which quantum keys are distributed to a plurality of parties for secure multi-party communications. The quantum key does not work seamlessly with encryption methods.

United States Patent Application Publication No. 2012/0300939 discloses authentic occasion by recognition of node identity. However, a system providing for interaction of other parameters with the node identity is not provided.

United States Patent Application Publication No. 2014/0315514 discloses a wireless device including a subscriber identity module. The subscriber identity module stores rules defining an acceptable set of behaviors for a wireless module. Action is taken to avoid cooperation with a wireless module that manifests aggressive behavior based on the rules. The wireless modem is blocked from generating traffic in the offending wireless network. However, no specific affirmative action is taken.

SUMMARY

Briefly stated, in accordance with the present subject matter, an apparatus, method, and a non-transitory programmed medium are provided in which a customer authentication security server (CASS) stores keys registered by a transmitting user and by a receiving user. Data to be sent is encrypted at the object level. A protocol and key management method allow a sender to identify a recipient and access an appropriate key using only publicly available information. A source generates a random symmetric session key and encrypts data at the object level with the key. The source selects a party, parties, or a particular group of parties that are authorized to have access to the encrypted data by specifying receiver IDs. Each receiver ID is a Public Identity Variable. Only public identity of a receiving party or group must be known. Receiver IDs can be created to define a group of recipients. In this manner, separate encrypted messages need not be sent to each group member. In order to register each key to correspond to its unique owner or group, the customer authentication security server receives and stores each party's key. Two or more parties are enabled to exchange and manipulate data without knowing the other party's encryption key.

The source selects a set of "Security Policy" variables which will be controlled. A set of data is added with a secured session key. A selected set of data is used to create a cryptographically secure "Header-Tx" with a secured session key and an Access Control List with an embedded security policy.

Data is sent to a receiver via the customer authentication security server. The server uses variables for authentication such as the network location of the recipient, GPS location, time of day, receiver passwords, receiver biometrics, messaging data document number, and other available identifiers. Attributes of identification and management of keys can be changed during use.

The customer authentication security server senses whether authentication succeeds or fails. The customer authentication security server can take positive actions beyond simply refusing access to the unauthenticated recipient. In the current system, each payload may include good data and dummy data. The system can select dummy data to be transmitted in response to unsuccessful authentication. In another form, the system can transmit and load spyware in order to locate the unauthenticated party.

BRIEF DESCRIPTION OF THE DRAWINGS

The present subject matter may be further understood by reference to the following description taken in connection with the following drawings:

FIG. 17 is a chart illustrating exemplary object level encryption protection variables;

FIGS. 19A-19B is a chart illustrating exemplary object level encryption detection variables; and FIGS. 20A-20B is a chart illustrating exemplary object level reaction detection variables.

DETAILED DESCRIPTION

In accordance with the present subject matter, an apparatus, method, and non-transitory programmed medium are provided for encrypting and decrypting an object sent between two parties. The object is electronic data. Examples of objects include files, video streams, images, messages, e-mails, virtual private network (VPN) security keys, data streams, and VPN sessions. The objects may be sent and received by computers operating independently, computers operated by a user, smart phones, radios, or servers. The system utilizes object level encryption (OLE).

Encryption keys are transferred in order that an intended party can decrypt an object that was encrypted by a sending party. Each party has a unique secret encryption/decryption key. A key management method and system are provided in which the sender's and the recipient's key are stored in a security server. The sender may transmit data encrypted with the sender's key and identify the recipient only with publicly available information. The recipient's public identity can comprise one or more unique identifiers. Examples of unique identifiers are processors/hardware public serial number and name, Internet Protocol (IP) address, e-mail address, and telephone number. Public identities may also be used for groups. Two or more parties can transfer, store, or reject encrypted information without knowing the other party's encryption key.

Figure 1:
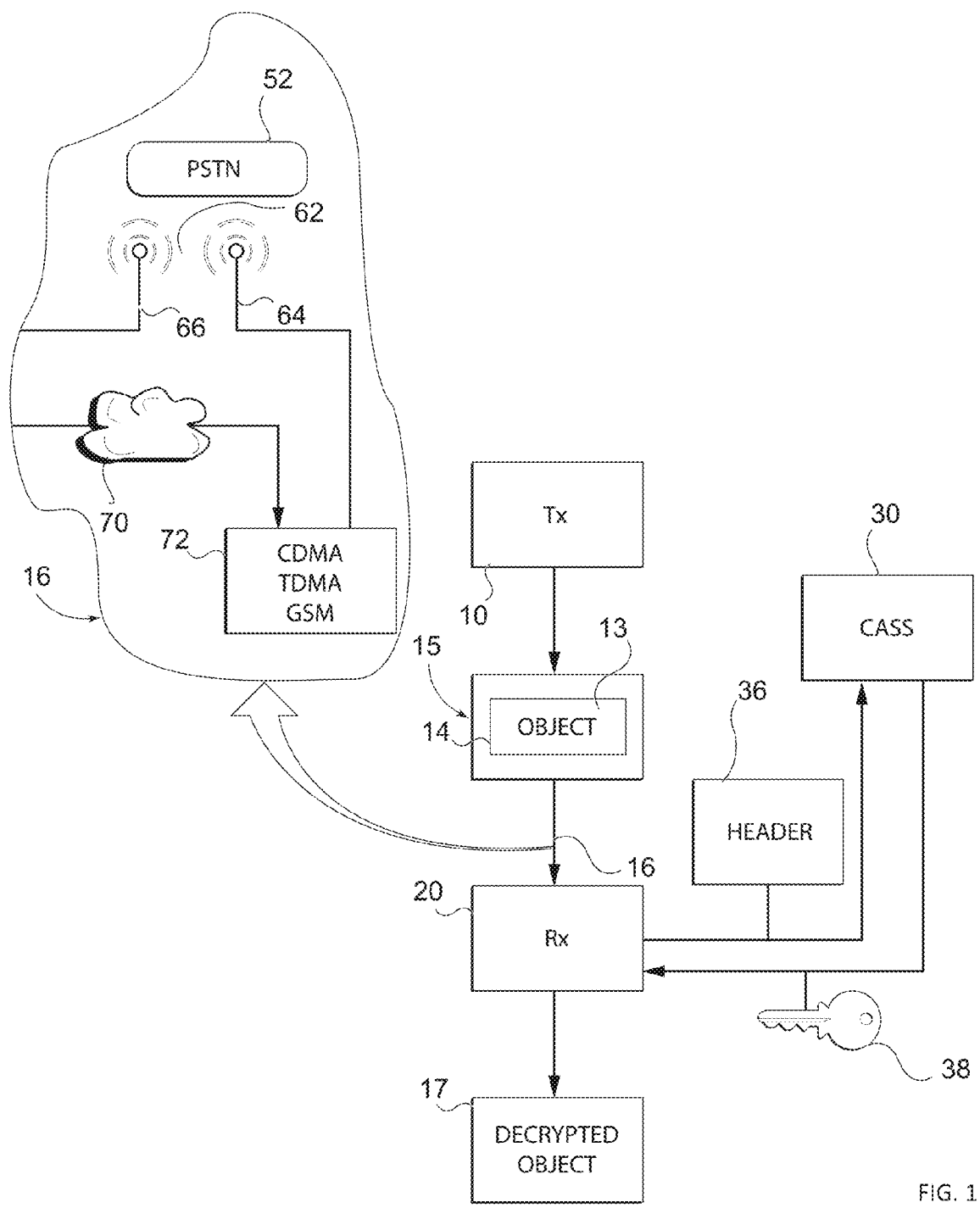
FIG. 1 is a top-level block diagram of a system incorporating the present subject matter.

FIG. 1 is a top-level block diagram of a system incorporating the present subject matter. A transmitter 10 sends an object package 15 to a receiver 20 over a link 16. A party may comprise a user-operated computer, an attended or unattended computer, radio, server, smartphone, or other communications device. The object package 15 includes an object 13 as encrypted. The object 13 as encrypted is referred to as the encrypted object 14. The object 13 is virtually any type of electronic data, for example, files, video streams, images, messages, e-mails, virtual private network (VPN) keys, data streams, and many other forms of intelligence. After the receiver 20, has received the object package 15, authentication is performed. Authentication is done in a customer authentication security server (CASS) referred to herein as security server 30. The term CASS in the present invention is also used as an adjective to indicate things that interact with security server 30. The receiver 20 sends a header 36 comprising identity information received from the transmitter 10 and identification of the receiver 20. If authentication is successful, the security server 30 will provide a session key 38 to the receiver 20 for decrypting the encrypted object 14 to provide a decrypted object 17.

The link 16 could comprise a local area network (LAN), a wide area network (WAN), or the Internet. The link 16 may take many forms including a publicly switched telephone network 52. The link 16 could comprise a Wi-Fi system 62 having a transmitting antenna 64 and a receiving antenna 66. Alternatively, the link could comprise the Internet 70. This system can be used with time division multiplex access (TDMA), code division multiplex access (CDMA), or Global System for Mobile communications (GSM).

Figure 2:
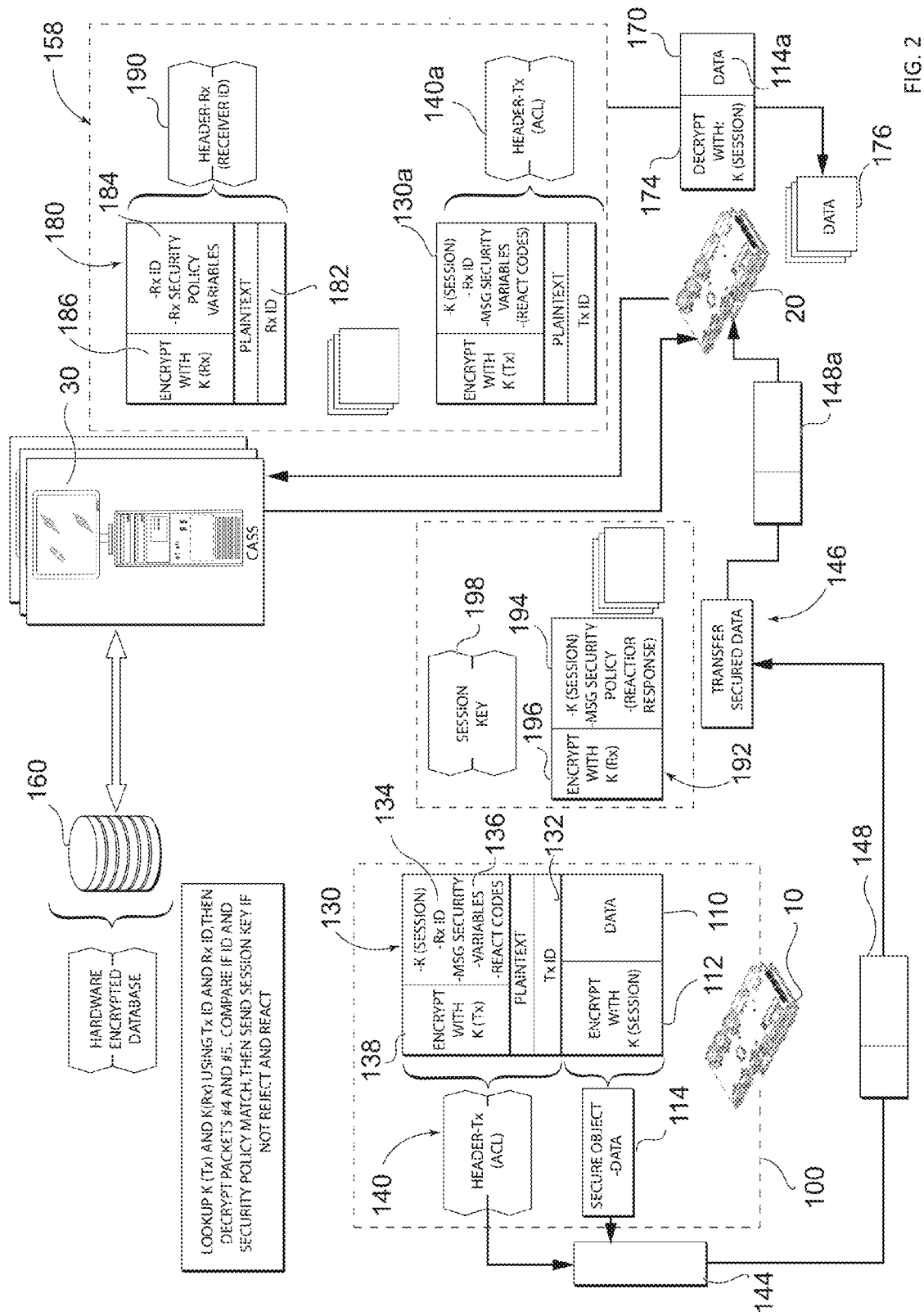
FIG. 2 is a block diagram of the system of FIG. 1 illustrating object level encryption details.

FIG. 2 is a block diagram of the system of FIG. 1 illustrating object level encryption details. The transmitter 10 comprises a processor 100. An object 13 at a data location 110 is encrypted with a key from a key generator 112 to provide secure object data 114. The secure object data 114 comprises the data 14. This process is referred to as object level encryption. A transmitter ID, TxID, is stored in plaintext in a transmitter data structure 130 at a location 132. In location 134, a data package 136 is stored comprising a session key K(session) 138, receiving party identification RxID, message security variables, and reaction response codes. Message security variables and reaction codes are discussed in detail below. This data package is encrypted with a transmitter key, KTx, to provide an encrypted transmission header, Header-Tx, 140. The transmission header 140 also comprises an access control list (ACL). The transmission header 140 and the secure object data 114 are combined by transmission data interface circuit 144 to provide a protected transmission packet 148. A data transfer unit 146 provides an output from the transmitter 10 for transfer to the receiver 20.

The receiver 20 comprises a processor 160. The processor 160 receives a protected transmission packet 148a from the data transfer unit 146. The protected transmission packet 148a is separated into a Header Tx 140a and the secure object data 114a. The Header Tx 140a is stored for use in authentication. Authentication is performed as described with respect to FIG. 7 below. If authentication is successful, the key K(session) will be provided from location 174. Decrypted data is provided to a data output module 176. The suffix "a" denotes a data item as received by the receiver 20 corresponding to the data item as sent from the transmitter 10.

The processor 160 creates its own header, Header Rx 190. The Header Rx 190 is generated in a receiver header generation module 180. A location 182 includes the identity, RxID, of the receiver 20 in plaintext. The RxID and receiver security policy variables at a location 184 (defined below) are encrypted with a receiver key K(Rx) at a location 186. After receiving the encrypted data package 148a from the transmitter 10, the receiver 20 requests authentication from the security server 30.

To this end, the receiver 20 transmits Header Tx 140a and Header Rx 190 to the security server 30. As illustrated and described in further detail below, the security server 30 comprises a hardware encrypted database 160. The hardware encrypted database 160 looks up KTx and KRx, which have been provided to the database 160 as described with respect to FIG. 4. The Header Tx 140a and the Header Rx 190 are compared. If authentication is successful, as described below, the security server 30 sends a data structure 192 including a data block 194 and a data block 196. The data block 194 includes the session key K(session). Data block 194 comprises security policy and reaction responses. The data block 196 includes KRx. Data in block 194 is encrypted with KRx in block 196 to provide a session heading 198.

Figure 3:
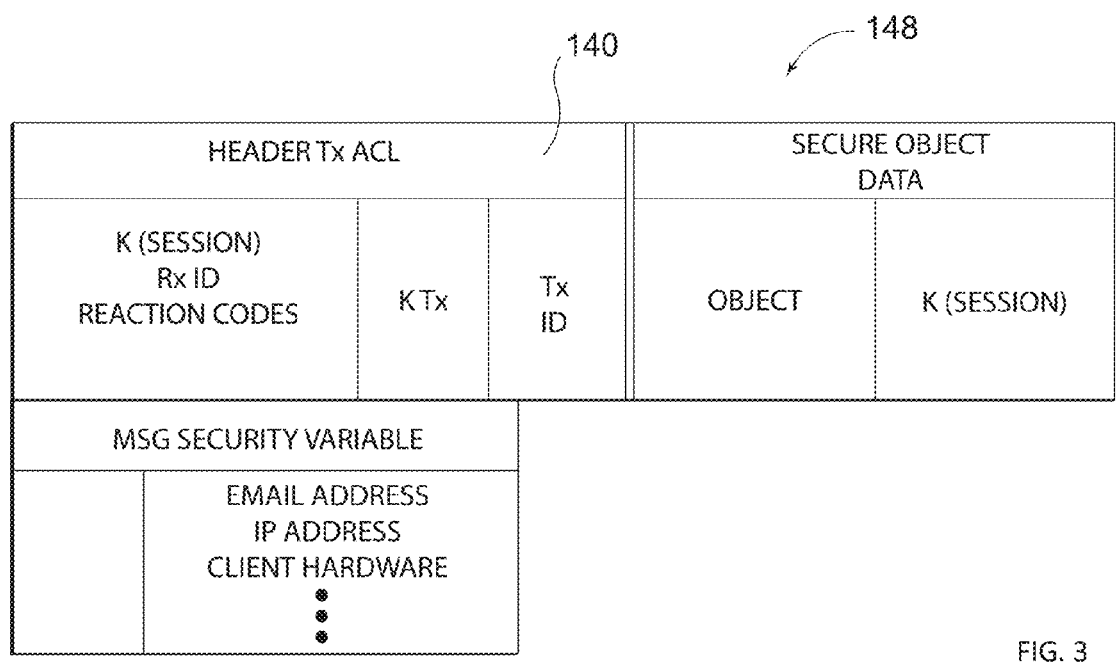
FIG. 3 is a diagram of the structure of a protected transmission.

FIG. 3 is a diagram of the structure of a protected transmission packet 148. The protected transmission packet 148 is provided from the module 144 (FIG. 2). The components of the protected transmission packet 148 are ordered in accordance with a selected communications protocol. Any order of components may be utilized so long as a compatible protocol is utilized.

Figure 4:
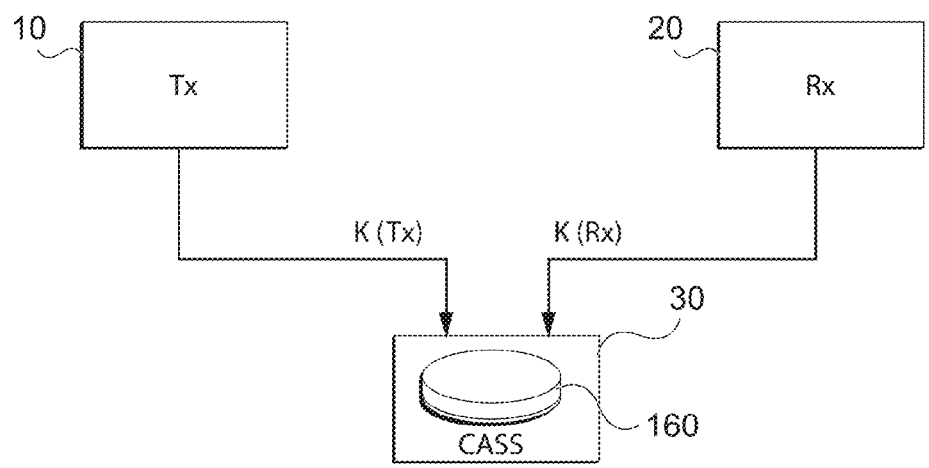
FIG. 4 is a diagram illustrating loading of a transmitter's key and a receiving party's key to a relational database in a computer authentication security server.

FIG. 4 is a diagram illustrating loading of the transmitter 10's key and the receiver 20's key to the relational database 160 in the security server 30. This operation is performed prior to transmission of data. Keys may be changed at users' options. First time individual secret symmetric key registration of each party can be made in a number of different ways. Keys can be created using a random number generator to create a random number which will comprise the key stored to software memory. Additional encryption details selected from a set of selectable encryption details such as in FIG. 8 below can also be registered.

Figure 5:
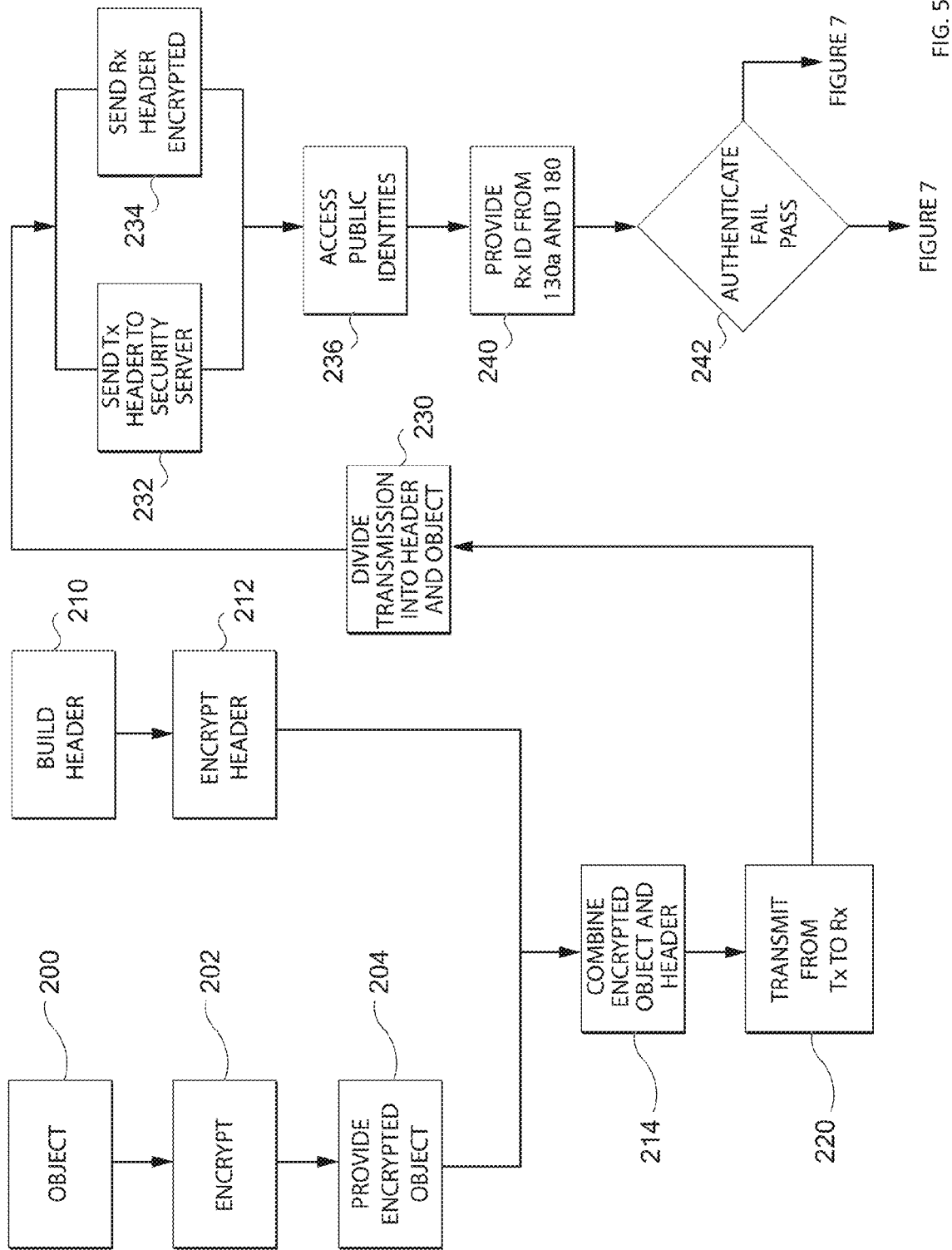
FIG. 5 is a flowchart illustrating operation of a first embodiment.

FIG. 5 is a flowchart illustrating operation of a first embodiment utilizing standard symmetric encryption to transfer a basic session key between two parties. At block 200 an object 13 is loaded in a data location 110 (FIG. 2). The object 13 could comprise a streaming signal, text, image, or any of a number of forms of intelligence. At block 202, the object 13 is encrypted. At block 204, the secure data object 114 is provided.

At block 210, a data package is built. The initiation of block 200 and block 210 are both initiated in a time window such that the Header Tx 140 and the secure object data 114 can be combined and transmitted together. The data package comprises K(session), RxID, message security variables, and reaction codes. This data package is encrypted with the transmission key KTx. Additionally, the data package comprises the transmitter 10's ID in plaintext. At block 214, the Header Tx 140 and the secure object data 114 are combined to form a transmission package 148 which is sent to the receiver 20. At block 220 the transmission package 148 is sent to the receiver 20.

Operation on transmission package 148a as received by the receiver 20 begins at block 230. The transmission package 148a is divided. The header is stripped from the transmission package 148a to be used for authentication. The encrypted object from the secure object 114 is saved. Decryption is performed if authentication succeeds as further described below. Header Tx is sent to the security server 30 at block 232 Header Rx is sent to the security server 30 at block 234. At block 236, the public identities of the transmitter 10 and receiver 20 are identified and used to access the encryption keys that were loaded into the relational database 160. The RxID from the Header Rx 190 and the RxID included in the Header-Tx 140a are provided for comparison at block 240. Comparison may be made at block 242 between a selected plurality of identifying parameters discussed with respect to, for example, FIG. 8 below.

Figure 7:
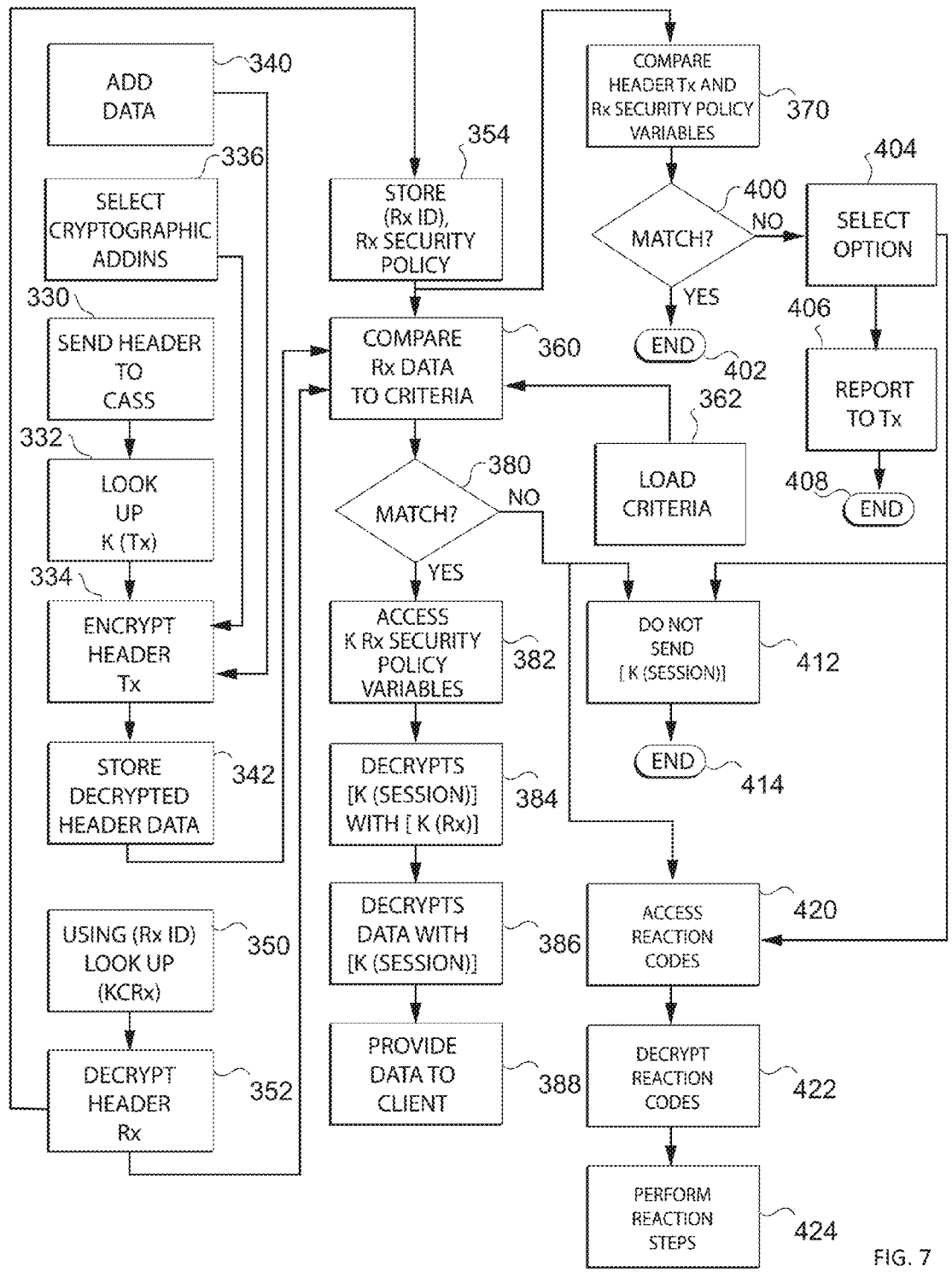
FIG. 7 is a flowchart illustrating the software and method for authentication in the security server.

If authentication succeeds, i.e., if there is a match, operation proceeds to block 382 in FIG. 7. In this manner, the receiver 20 receives a data package encrypted with its own key. The receiver 20 does not need to receive a key directly from the transmitter 10. The encrypted object is decrypted as described with respect to FIG. 7.

If authentication fails, operation proceeds to blocks 402 and 420 in FIG. 7. The entire authentication process including reaction routine is described in detail with respect to FIG. 7 below.

Figure 6:
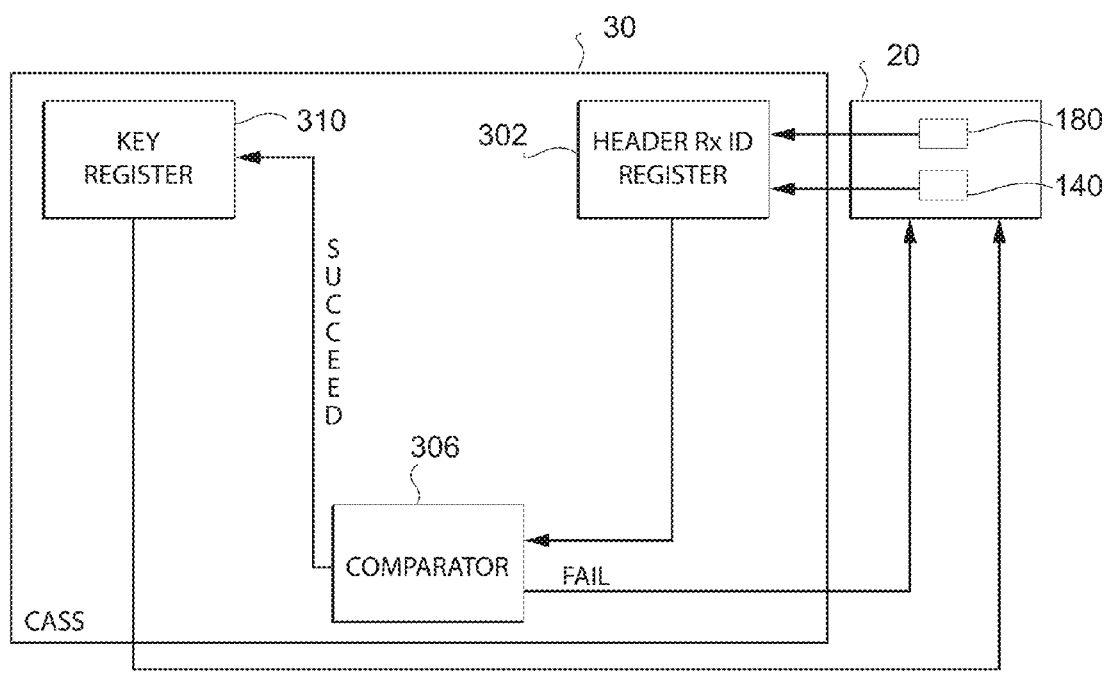
FIG. 6 is a functional block diagram of the security server of FIGS. 1 and 2.

FIG. 6 is a functional block diagram of the security server 30 of FIGS. 1 and 2. Hardware may be implemented in integrated circuits. Particular components need not be discrete as illustrated in FIG. 6. For authentication, the security server 30 uses an RxID register 302, a comparator 306 and a key register 310. Header Tx 140a includes the RxID as transmitted from the transmitter 10 in order to specify the desired receiver 20. The RxID is transmitted from the Header Tx 140a to the RxID register 302. The Header Rx 190 includes the actual RxID of the receiver 20. Each of the RxIDs is transmitted to the comparator 306. If the two RxIDs match, authentication has succeeded. A signal is provided to the key register 310. The key register 310 provides the Key(session) to the receiver 20. The Key (session) is used to decrypt the secure object data 114a and provide data to the data output 176 (FIG. 2). If the two RxIDs do not agree, the comparator 306 sends a failure signal to the receiver 20, and a reaction routine further described below is initiated.

FIG. 7 is a flowchart illustrating the software and method for authentication in the security server. Authentication can be provided for a transacted piece of data. Alternatively, authentication can be provided for creation of a communications session. A session can be defined by the system for any selected duration of time. A system user will select a set of authentication variables. The selected variables can define both authentication requirements and a security policy. This capability is enabled by the object level encryption system. The security policy is passed through a combination of the added authentication variables and/or specific Message Security Policy Variables. In the OLE System, the Message Security Policy Variables are encrypted with the transmitter 10's key K(Tx). The key provides the security server 30 (FIG. 6) with the proper variables for secure authentication of the receiver 20 and the receiver 20's security conditions. This Message Security Policy is encrypted and added as a header to the encrypted data. Security Policy variables can be selected through automated collection of data or can be entered by the clients.

At block 330, the headers containing the RxIDs are sent to the RxID register 302 as described with respect to FIG. 6. The system looks up KTx at block 332. The Header Tx is encrypted at block 334. Cryptographic add-ins may be added from block 336. Additional data, e.g., signatures, may be added from block 340. The decrypted Header data is stored at block 342.

Similarly, the RxID is used to access KRx at block 350. The Header Rx is decrypted at block 352 and stored at block 354. The Header Rx includes a security policy in the form of selected parameters. The decrypted Header Tx data is provided to the comparator 306 (FIG. 6) for comparison at block 360. Similarly, the decrypted Header Rx is coupled for comparison at block 360. Comparator criteria are loaded as indicated at block 362. Additionally, Header Tx and Rx security policy variables are compared at block 370. The RxIDs are evaluated at block 380. If the RxIDs match, operation proceeds to block 382 and KRx is accessed. At block 384 K(session) is transmitted to the data module 170 (FIG. 2). Data is decrypted at block 386 and provided to a client at block 388.

At block 370, security policy variables from each Header Rx and Header Tx are compared. If a match is found at block 400, the process ends at block 402. If the results do not match operation proceeds to block 404. One option is to report to the transmitter 10 at block 406 and this process ends at block 408. Alternatively, a mismatch can be determined at block 404 to end the session. Indications of a discrepancy are provided from the blocks 380 and 404. At block 412, a message is sent within the security server 30 which instructs security server 30 not to send K(session) to the receiver 20. This process ends at block 414. At block 420, reaction codes are accessed in response to a disagreement as detected at block 380 or block 404. At block 422, reaction codes are decrypted and at block 424, reaction steps are performed. The reaction routine is described below.

The OLE protocols enable the addition of authentication requirements to be added into the secure header. Common authentication variables include hardware ID, telephone number, e-mail address, IP address, personnel/client ID, time of day, security clearance level, location, and many others.

Figure 8:
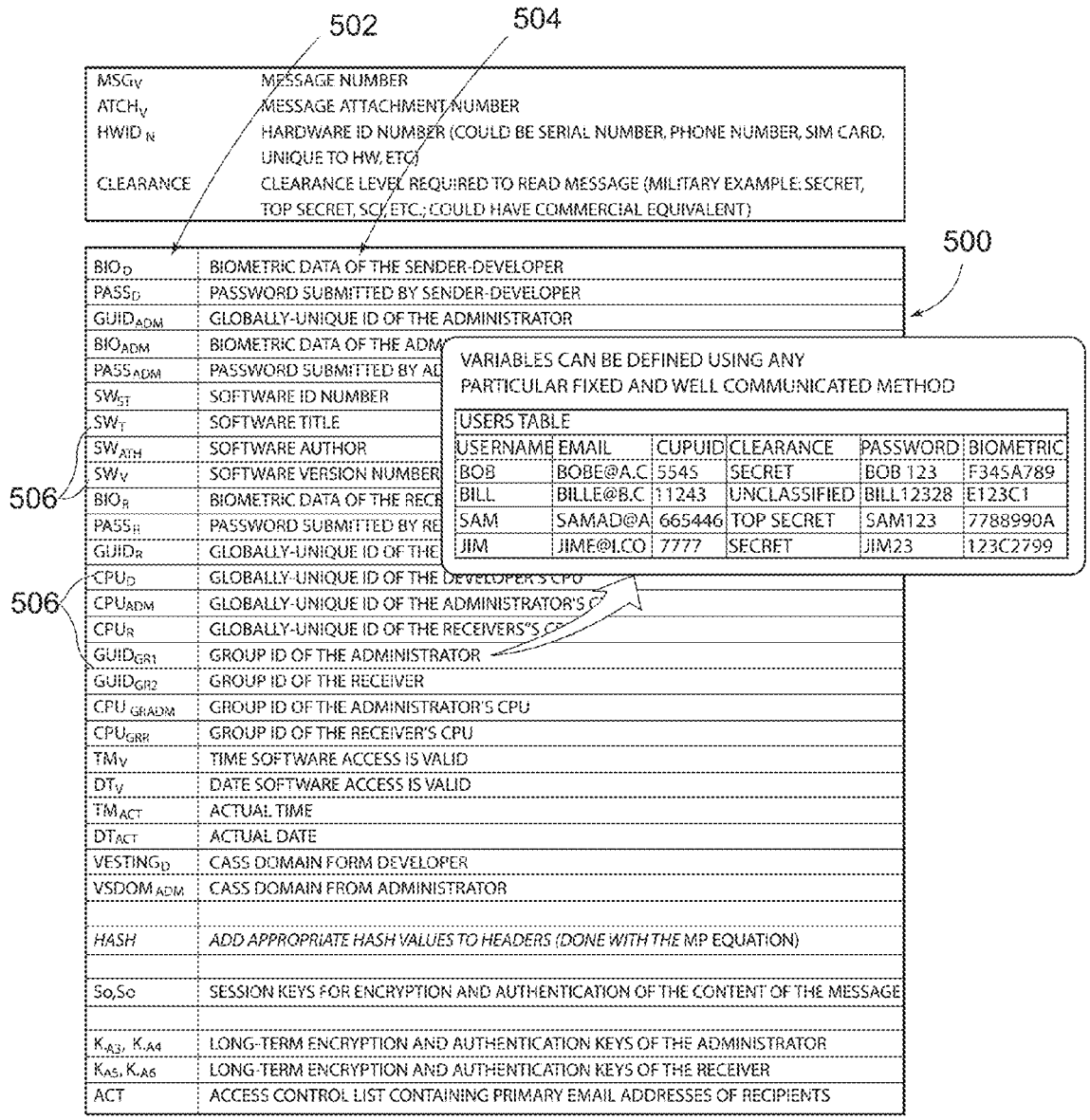
FIG. 8 is a chart illustrating exemplary parameters that may be included in authentication variables.
Figure 12:
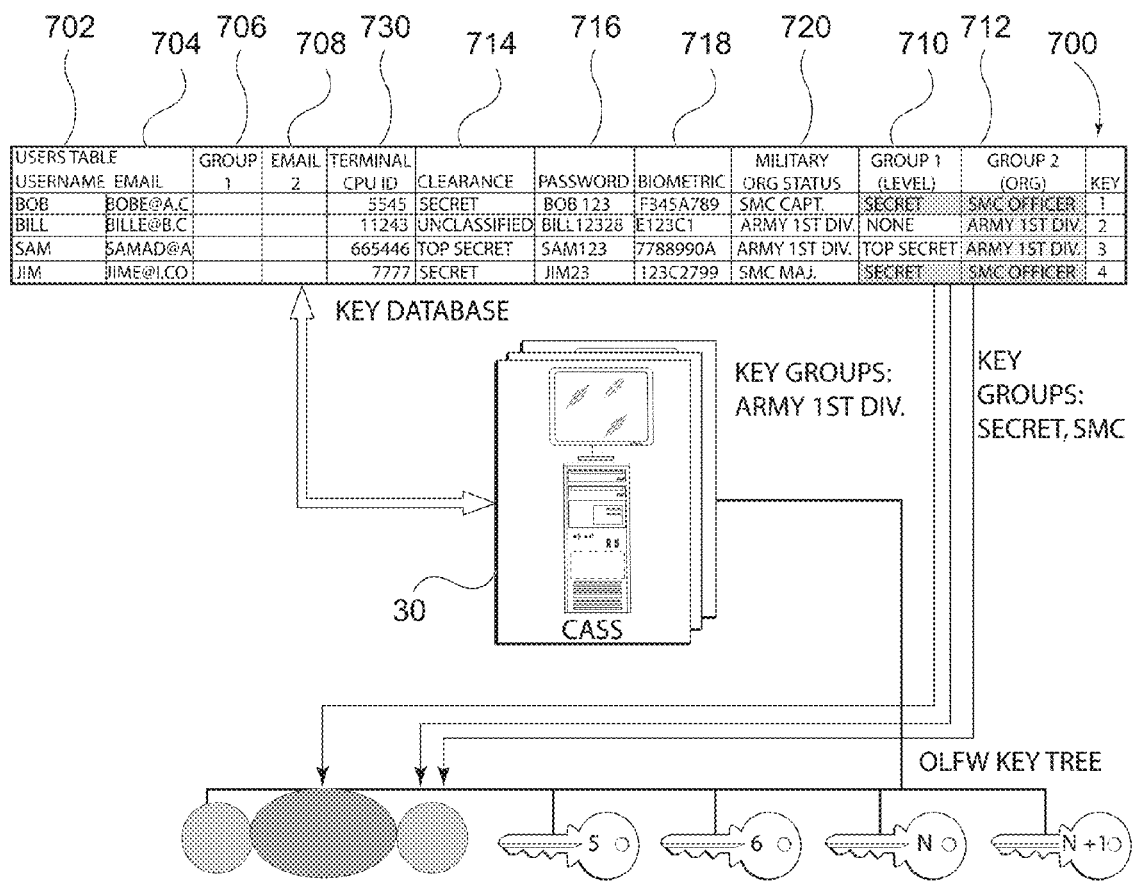
FIG. 12 is a chart illustrating assignment of a client to a group, creation of client ID group associations, and grouping of keys in object level encryption.

FIG. 8 is a chart 500 illustrating exemplary additional parameters that may be included in authentication variables. The chart 500 includes a first column 502 including variables. Each variable is listed in a row 506. Column 504 is a description of the corresponding variable in the same row 506. The chart below the text "variables can be defined" is shown in FIG. 12.

The security server 30 preferably comprises one of a number of hardware architectures to make the security server "hack-proof." "Hack-proof" is a term describing a system that is more secure than comparable systems for comparable applications. "Hack-proof" is not a literal performance specification.

Figure 9:
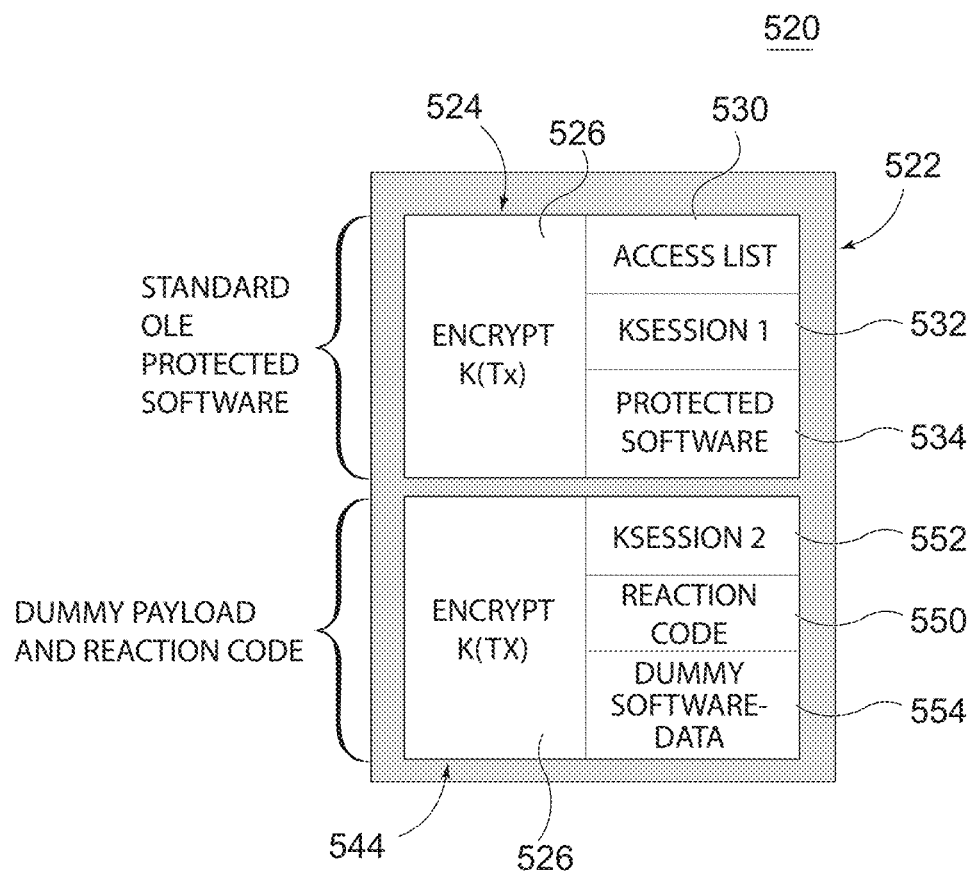
FIG. 9 is an illustration of a software structure suitable for use to respond to a failed authentication.

FIG. 9 is an illustration of a software structure suitable for use to respond to a failed authentication at either block 380 or 400 of FIG. 7. This method is referred to as Protect-Detect-React. A transmitted data structure 520 includes a standard data block 524. The standard data block includes encryption key KTx 526. The fields provided for encryption include an access list 530, key K(session1) 532, and protected software 534. The transmitted data structure 520 also includes a reaction data block 544. The standard data block 524 includes encryption key KTx 526. The fields provided for encryption include a reaction code 550, key K(session2) 552, and a dummy set of software and/or data 554. If authentication fails, the reaction data block 544 is released. A number of different forms of reaction code could be issued. For example, reaction code could launch spyware which is transmitted in order to track the unauthenticated location.

Figure 10:
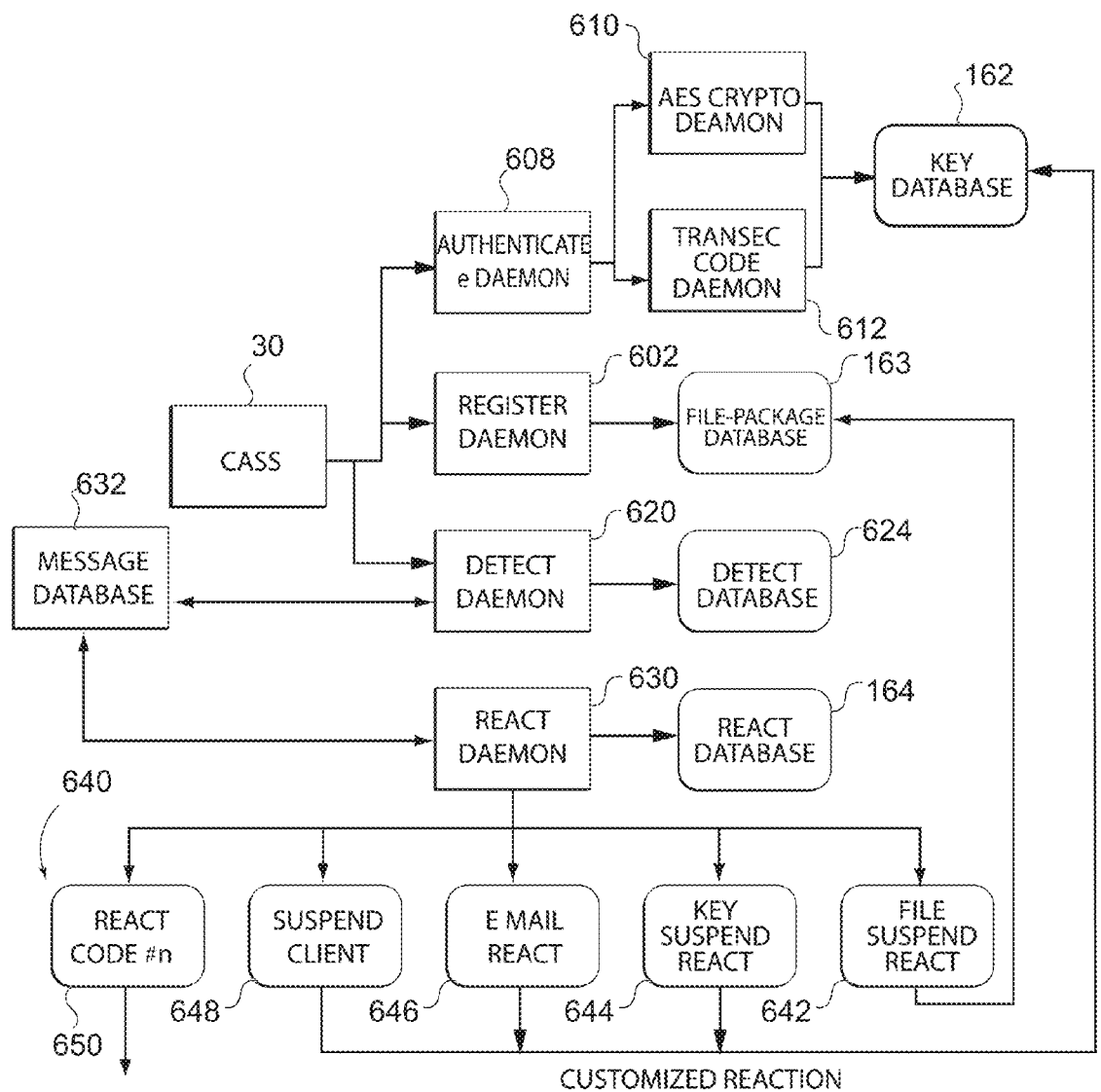
FIG. 10 is a block diagram of the architecture of the security server.

FIG. 10 is a block diagram of the architecture of the security server 30. The system of the security server 30 contains a plurality of functions built as daemons. A daemon is a program that runs continuously in the background and is ready to perform an operation in response to a service request. A register 602 allows users or administrators to register keys as well as serial numbers, passwords, time requirements, user groups, and other authentication variables which may be loaded into the relational database 162. An authentication daemon 608 enables terminal source system computers to authenticate parties and transfer session encryption keys and TRANSEC Code variables. The authentication daemon 608 comprises an AES crypto daemon 610 and a TRANSEC Code daemon 612. The daemons control movement of keys to the key database 162. A detect daemon 620 provides lookup database queries and provides detection of failed authentication attempts at a detect database 624. A react daemon 630 provides automatic actions in the case of authentication failure or failure to match security policy. A detected intrusion or failed authentication attempt, as signaled by the detect daemon 620, accesses a react database 634.

Preset reaction policies are illustrated in a row 640. Reaction policies include a file suspend react 642 and a key suspend react 644. An e-mail react 646 may be used to notify a system administrator of an authentication failure. A suspend client reaction policy 648 can suspend communication with a client that is not authenticated. A reaction code n 650 can specify particular actions to take in response to the react daemon 630. N is an integer corresponding to a selected action.

The "Protect, Detect, and React" (PDR) method comprises additional capabilities. The OLE system inserts an active authentication server, the security server 30, into the key management process. Protection is provided by the cryptographic encapsulation if the data and authentication vary. A number of additional protection elements are used during the transmitter encryption process. These include additional cryptographic treatment, cover, and/or randomization of data.

Detection is achieved when a variable is missing, incomplete, or discrepant from a correct receiver's identity. An incorrect receiver's identity is one that is not on the Access Control List (FIG. 2) or that does not match a message Security Code. An unauthorized party may attempt to ping the security server 30 in an attempt to learn keys, codes, or algorithms. The unauthorized party may be trying to use a stolen computer or smartphone. The security server 30 will respond to this fault because the headers are uniquely encrypted communications bundles that are impossible to generate without every item in place at a first time.

Reaction comprises launching of an active countermeasure from the security server 30. The active countermeasure is in the security server 30 database system or in the receiver's processor software. The security server 30 will, when the option is selected, notify administrators of faults based on a security policy comprising variables included in the header. The OLE system utilizes the requester's individual secret key. In the case of a failure to authenticate, only one key needs to be revoked. However, other members in an OLE group will remain valid.

Figure 11:
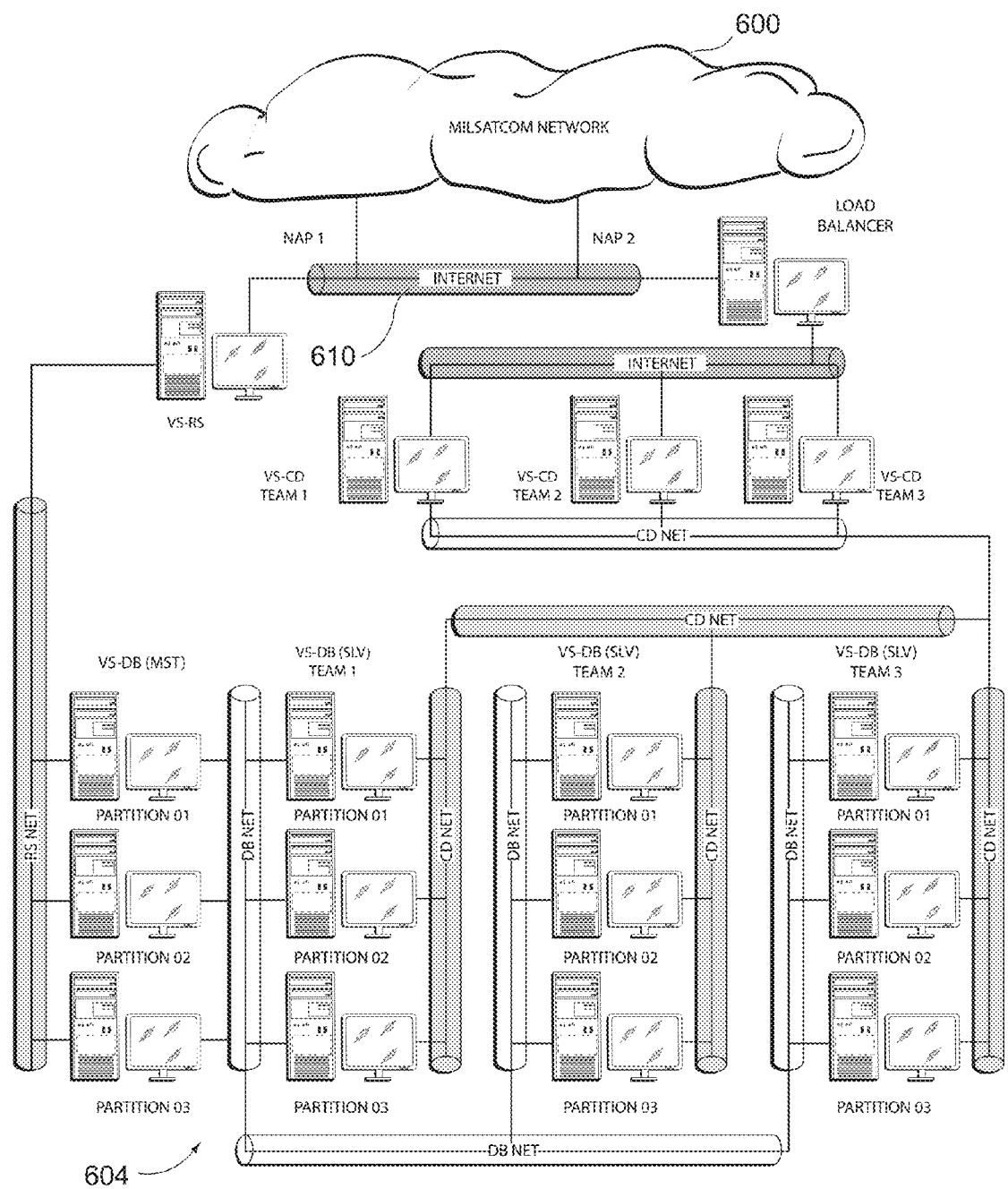
FIG. 11 is a block diagram of an embodiment of the security server particularly suited for high-volume applications.

FIG. 11 is a block diagram of an embodiment of the security server 30 particularly suited for high-volume applications. The CASS server system can be scaled to accommodate a very high volume of users, for example volumes of users on such websites as www.Google.com. Connectivity is provided via common techniques such as an IP network, phone system network, or LAN network. In FIG. 11, a military satellite communications network (MILSATCOM NETWORK) 600 is coupled to a network 604 by the Internet 610. FIG. 11 is an example of a distributed or very large security server 30. "Very large" could mean having the capability of handling millions of interchanges per day.

FIG. 12 is a chart 700 illustrating assignment of a client to a group in object level encryption. In embodiments comprising the arrangement of FIG. 12, a group of clients is authenticated as a single client. Grouping keys are produced by creating a group public ID. Names of individual clients are listed in column 702. In column 704, individual clients are identified by e-mail address. Columns 706 and 708 identify first and second groups and define the group to which a client in column 704 is assigned. The relational database 162 (FIG. 2) may use MySQL for Oracle SQL, for example. Group associations are used by the OLE protocol to provide access to groups such as those identified in columns 706 and 708 and to the clients respectively assigned to each group.

A spreadsheet representation of a database can be built into a larger SQL database and used to authenticate or deny Headers based on meeting group accept/reject criteria. Further attributes are selected to define the Security Policy of this embodiment. A column 710, entitled Group 1, lists levels of security clearance each defining one group. Classification levels include unclassified or none, secret, and top secret. Column 712, entitled Group 2, lists clients by organization. A column 714 lists security clearance level of each client. In the present illustration, the attribute is classification level.

In the present embodiment, further attributes that have been selected include password in column 716, biometric ID in column 718, and military organization status in column 720.

Because the data above are included in the relational database 162 (FIG. 1), public and private identity variables and group associations are effectively cross referenced along with group associations. The key database combined with the OLE authentication protocol can then be used to allow/deny access to encrypted data based on the Group Association(s). One individual or hardware terminal may be easily removed from a Group by making authorized changes to the database.

Figure 15:
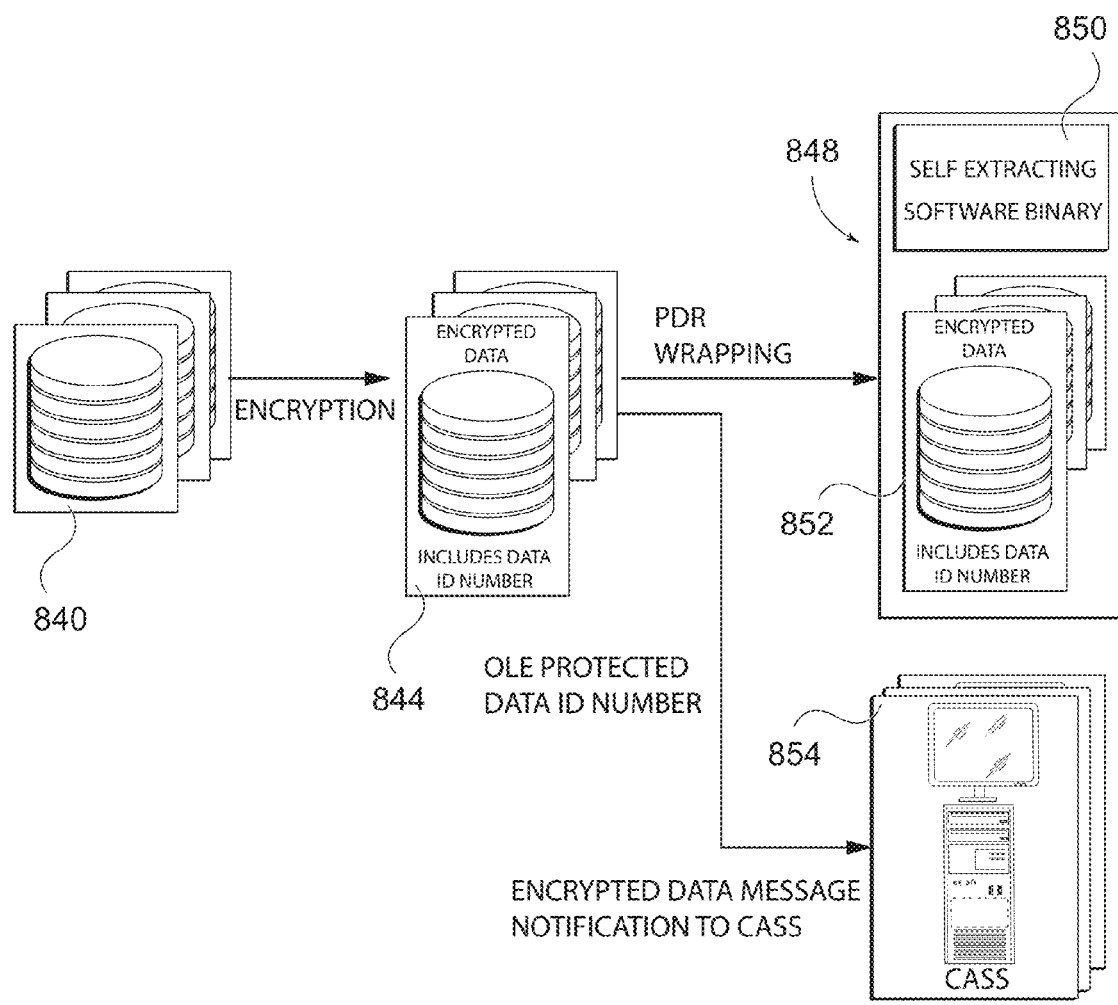
FIG. 15 is a block diagram of a client wrapper module protecting and delivering secure data.
Figure 16:
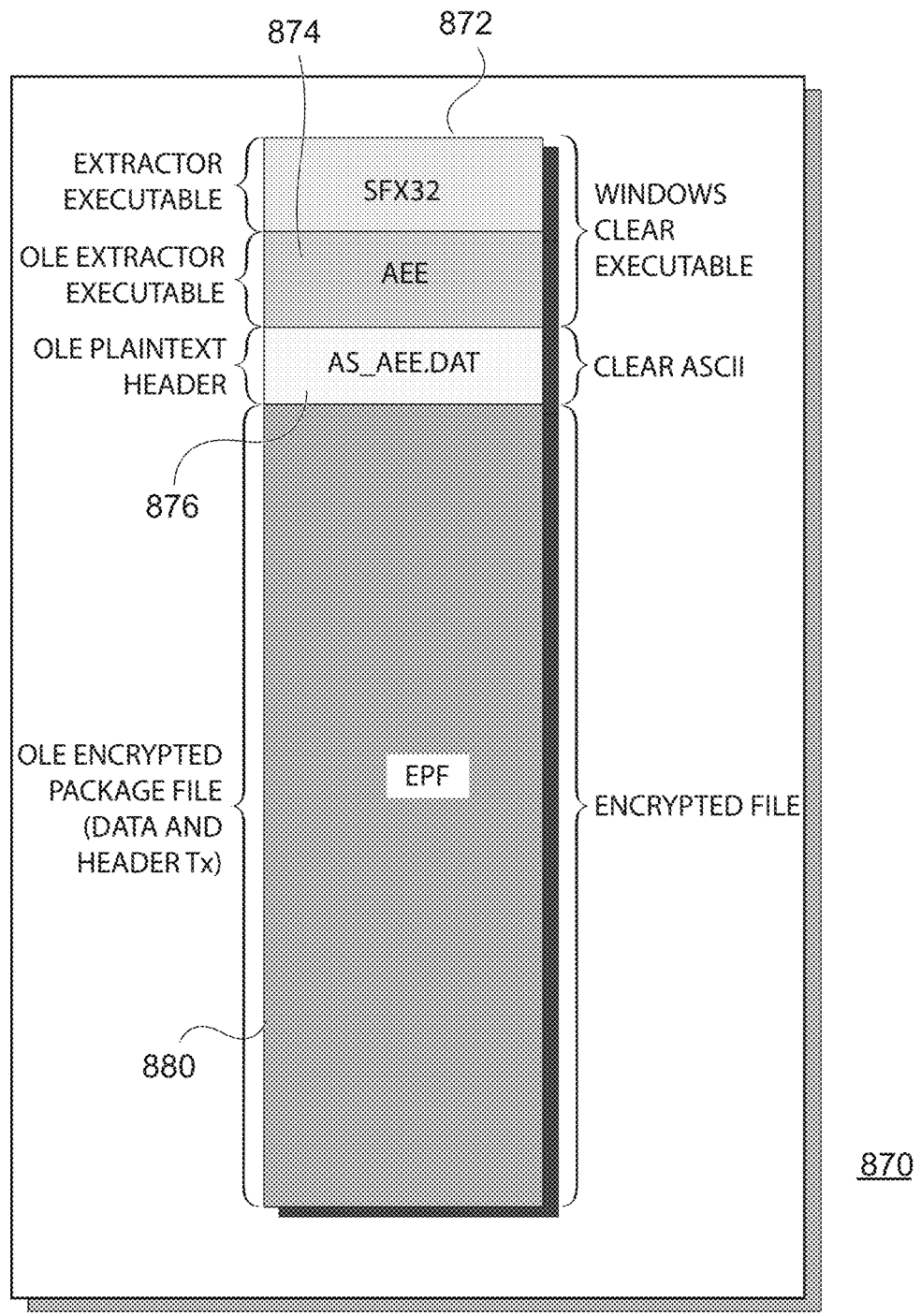
FIG. 16 is a chart illustrating an exemplary client wrapper module.

CASS provides authentication, session key transfer, and key registration. CASS is a database using an OLFW protocol and provides normal database functions. Normal database functions include add/delete authorization, track transactions, and implement policy. The reaction methods are implemented with scripts executing policy. These methods include denial of authorization, revocation of keys, halting specific software access, sending e-mail to administrative personnel, and sending a "self-destruct" signal to a Client Wrapper Module (FIGS. 15 and 16).

Figure 13:
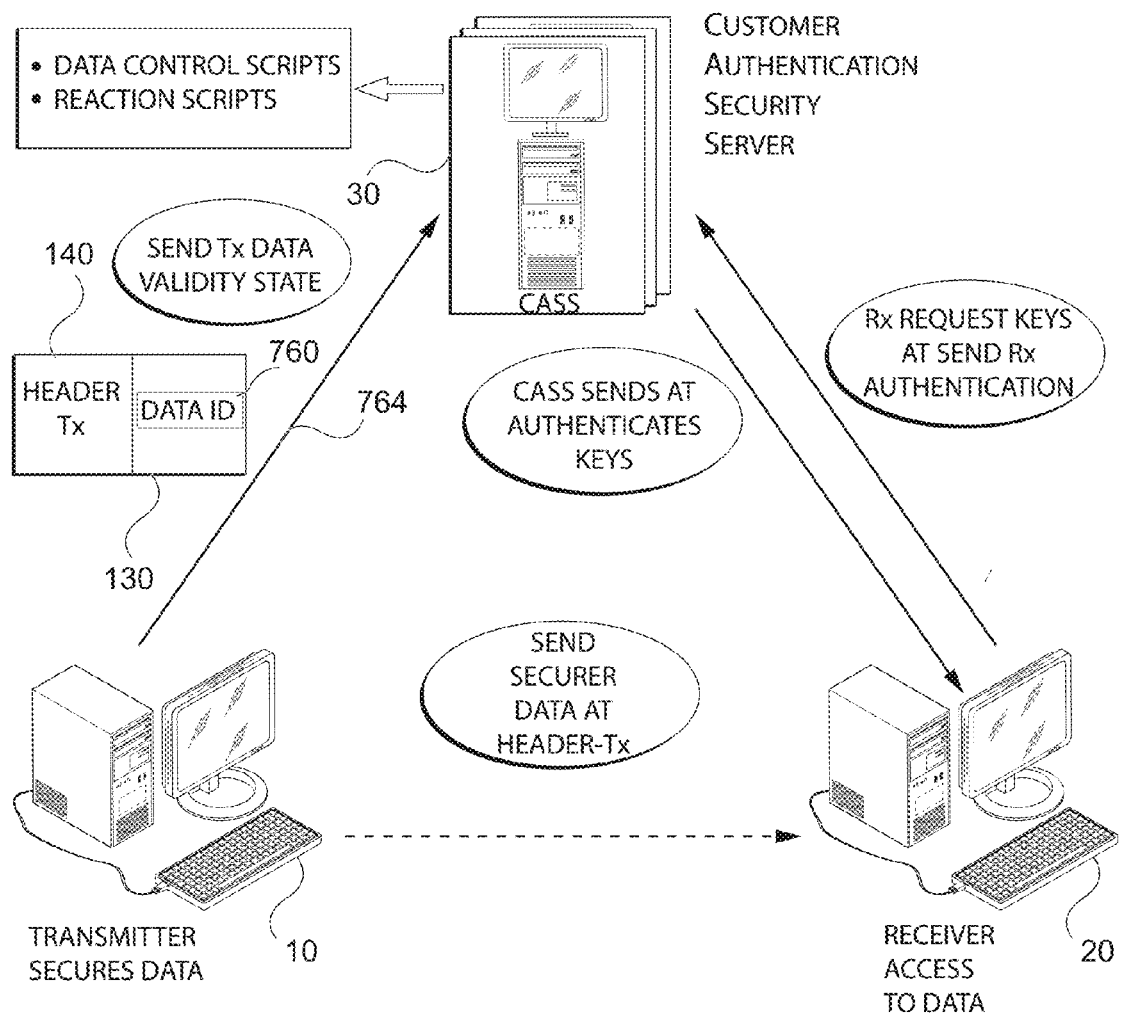
FIG. 13 is a block diagram illustrating an option for controlling data after the data has been sent.

FIG. 13 is a block diagram illustrating an embodiment in which access to a unique data package can be controlled even after the package is delivered to the receiver 20. In this embodiment, a Data ID number 760 is added into the data structure 130 for inclusion into the Header Tx 140 as a Security Policy Variable. This enables implementation of control of individual data packages directly from the transmitter 10 or by a trusted administrator having access to the data structure 130. The Data ID number is stored by the transmitter 10 for later use. Once a data package is determined to be deemed to be revoked, the transmitter 10 can send an OLE cryptographically secure message to CASS with the Data ID number 760 and a code to revoke the message. CASS can then store this data control "command" and reject authentication anytime that individual data package is requested to be authenticated.

Operation proceeds as in FIG. 2. However, the object level encryption protocol is modified to include the additional data ID number 760. The Data ID number 760 is an additional parameter that must be looked up. Once the Data ID number 760 is looked up, it is compared to a CASS Message List to determine if the particular message has been commanded to be revoked. If not revoked, the key K(session) is sent as in FIG. 2. If the authorization for the message has been revoked, then non-authentication is indicated. The key is not sent. A reaction routine may be initiated.

The OLE process/protocol is modified and an additional communication link step is provided between the transmitter 10 and the security server 30. This additional operation is shown by arrow 764 in FIG. 13. The authentication comparison will determine if the message is still "valid" based on the inclusion of the Data ID number. The Data ID number can be added at any time after the initial data structure 130 was created. The Data ID can be used for security server 30 notification of a request for decryption of secure data. If the Data ID number has not been revoked and all other OLE authentication steps were determined to be acceptable, the session key K(session) is authorized and sent using the standard OLE process.

Control of the data can be augmented by using a client hardware/software application design that only acts as a "viewer" to the receiver client and does not allow the decrypted data to be stored after decryption. In this application of OLE, the receiver client only is able to display the data; when the application or file is closed it returns to its OLE encrypted state.

Figure 14:
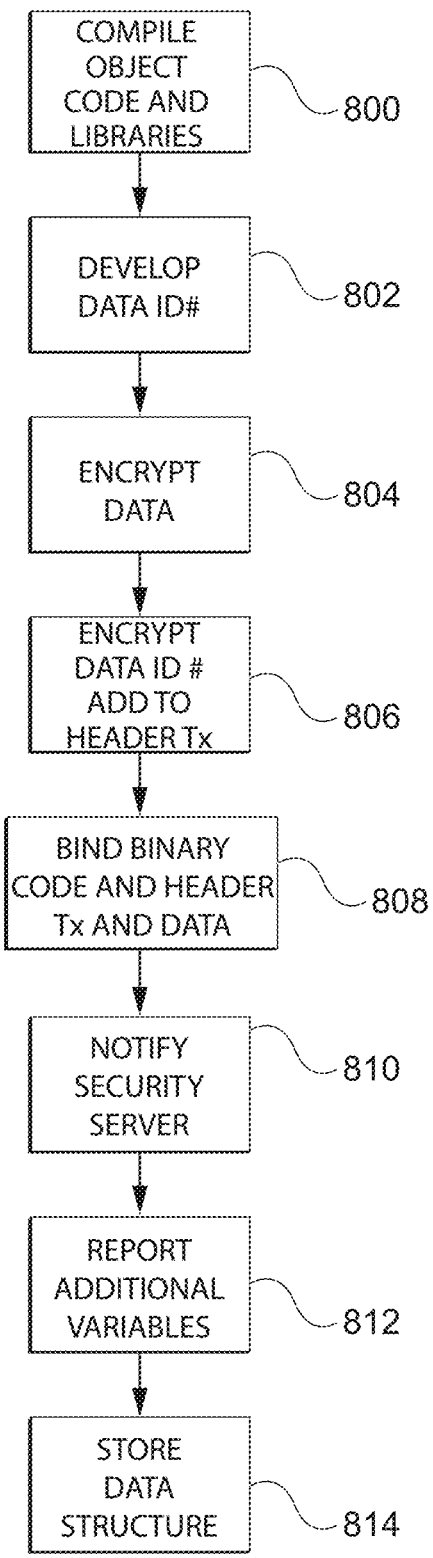
FIG. 14 is a flow chart illustrating an executable software program in which the Protect, Detect, and React (PDR) system is implemented.

FIG. 14 is a flow chart illustrating an executable software program in which the Protect, Detect, and React (PDR) system is implemented. The OLE technology can be used to develop a PDR system comprised of an encrypted data package and an associated authentication/delivery system. The embodiments above relate to an apparatus, method, and non-transitory programmed medium to protect data with an embedded Access Control List for one or more users. Additionally, Detection and Reaction Criteria are specified.

The embodiment of FIG. 14 provides implementation of the PDR system in an executable software program. The executable program may be run within the transmitter 10.

The program begins at block 800 in which source code is used to compile self-extracting software binary code with applicable supporting data and libraries. At block 802, data identifier number, e.g., the Data ID number 760, is developed and delivered to the data structure 130. At block 804, encryption is performed to encrypt the data, nominally the ACL, session key, and security policy as described with respect to FIG. 2. The public ID, Tx ID is added. The Data ID number 760 is encrypted and added into the Header Tx 140 at block 806.

At block 808, the self-extracting software binary code with encrypted data and entire Header Tx are bound in an appropriate package to be executed on the receiver 20's computing platform. (Example: *.exe file for DOS/Windows operating systems, launch with double-click, etc.). When validation succeeds, the OLE protected communication method notifies the security server 30 and the receiver 20 at block 810.

At block 812 variables can be sent to the security server 30 to be stored by CASS for future authentication purposes. The variables may include TxID, Data ID number, authorized clients (Access Control List), authorized processors (Processor ID List), applicable security policy, and reaction policies to follow if authentication fails. At block 814 the resulting file (data structure) is then stored and/or transmitted for any number of future uses by receivers.

FIG. 15 is a block diagram of executables that are created and performed in the process of FIG. 14. A compiler executable 840 comprises compiled object code along with supporting data and libraries. This module performs encryption and leads to production of encrypted data in an encryption executable 844. The OLE protocol is performed. Encrypted data is sent via PDR wrapping to data extraction executable 848. The data extraction executable 848 includes a self-extracting binary code module 850 and contains encrypted data 852 including the Data ID number. The encrypted data executable 844 is also followed by an encrypted data notification 854 to the security server 30.

FIG. 16 is a chart illustrating an exemplary client wrapper module file structure 870. The file structure 870 includes an extractor executable 872, and an OLE executable 874. OLE plaintext header 876 is preferably provided in clear ASCII. An OLE encrypted package file 880 includes data and Header-TX.

FIG. 17 is a chart 900 illustrating exemplary object level encryption protection variables. Column 902 lists names of protection variables that may be used in a security policy. Examples include transmitter IP address, data title, receiver IP address and other identifiers with respect to the transmitter, receiver, and the data itself. Column 904 specifies the Header in which the respective value is included. Specification of plaintext or encryption is listed in column 906. Column 908 identifies the encryption key associated with each variable. A protection value associated with each variable is listed in column 910. The protection value relates to the data entity which is being protected.

Figure 18:
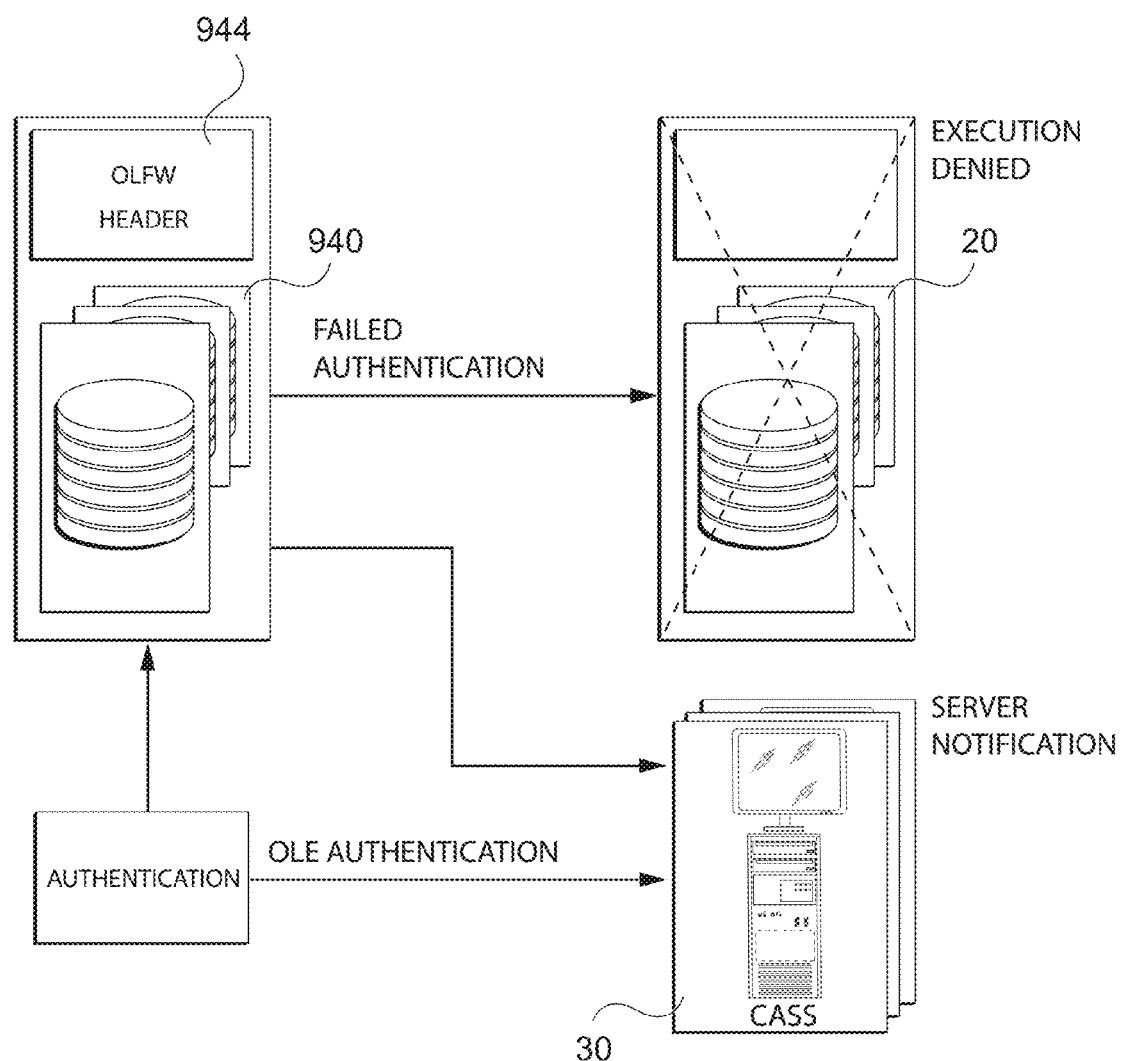
FIG. 18 is a diagram illustrating detection of an authentication failure.

FIG. 18 is a diagram illustrating detection of an authentication failure in the software-operated embodiment. Authentication is performed at an authentication module 940. Failure of authentication is reported to the security server 30 and to an OLFW Header 944. The failed authentication is reported by the Header 944 to the server to instruct the receiver 20 to deny execution of decryption. At the same time, the security server 30 is notified that the denial of execution has been issued.

FIGS. 19A-19B is a chart 1000 illustrating exemplary object level encryption detection variables. OLE detection variables are used to define forms of a Security and Authentication Policy. Names of variables that may be used in a security policy include transmitter IP address, data title, receiver IP address and other identifiers with respect to the transmitter, receiver, and the data itself.

Column 1002 lists categories of detection. These categories may include transmitter errors 1006, administrator errors 1008, receiver errors 1010, processor errors 1012, access time of day errors 1014, data integrity errors 1016, and header integrity errors 1018. Note that an endless number of different reactions can be developed.

Column 1030 lists the detection variable or variables within each category of errors. Column 1040 specifies the header in which the respective value is included. In column 1060, different types of data within each detection category that are used for comparison in authentication are listed. For example, within detection category 1006, transmission errors, parameters for which a match is needed in authentication include Data ID number, transmitter password, and transmitter biometric. Column 1070 lists the location of each identified variable. Column 1080 lists an error condition corresponding to each instance of a failure to match within the authentication process.

Reaction by the CASS server takes place substantially simultaneously with failed detection. A series of automated software scripts can be written into CASS and/or the secured OLE Header Tx and/or into the receiver client software that are then initiated by CASS. CASS can directly run its own software reaction code, as seen in FIGS. 20A-20B below. CASS can also signal the receiver 10 with OLE secured Reaction Codes to initiate software embedded into the CWM 870 (FIG. 16) and/or the OLE Header-Tx. The Reaction Codes can also initiate software directly in client operating system/application software.

FIGS. 20A-20B is a chart 1100 illustrating exemplary "Reaction Variables" and different degrees of response that may be selected in response to each form of detection of failure of authentication. In all cases, the session key K(session) is not provided and access to data is denied. In FIG. 20 the detection variable examples are the same as those of FIGS. 19A-19B, and the same reference numerals are used to denote the same columns. A level of reaction to each error condition can be defined. Column 1110 describes "mild" reactions to failure of authorization. Column 1120 describes "mid" reactions to failure of authorization, and column 1130 describes "severe" reactions to each failure of authorization.

For example, one receiver error in the category 1010 and column 1060 denotes a detection of a discrepancy in receiver passwords. In column 1080 the error condition is identified as a receiver not having access to the data it is seeking. Different levels of reaction are listed in columns 1110, 1120, and 1130. The "mild" reaction in column 1110 is to notify an administrator or the receiver 10 seeking access. A "mid" reaction is to allow three failed attempts and then halt the receiver's account. A "severe" reaction as seen in column 1130 is to freeze the receiver's account after one incorrect password entry.

Column 1102 lists categories of detection. These categories may include transmitter errors 1106, administrator errors 1108, receiver errors 1110, processor errors 1112, access time of day errors 1114, data integrity errors 1116, and header integrity errors 1118. Note that an endless number of different reactions can be developed, these are simply a single set. Column 902 lists names of variables that may be used in a security policy. Examples include transmitter IP address, data title, receiver IP address, and other identifiers with respect to the transmitter, receiver, and the data itself. Column 904 specifies the header in which the respective value is included. Specification of plaintext or encryption is listed in column 906. Column 908 identifies the encryption key associated with each variable. A protection value associated with each variable is listed in column 910. The protection value relates to the data entity which is being protected in connection with the use of the protection value.

The OLE technology can be implemented into a number of different system types, providing encrypted security for different classes of data in respective applications. Examples of system types include computer, cell phone, or modem. Examples of data and systems include, but are not limited to, encrypted data streams (data in motion), encrypted files (data at rest), secure microprocessors in which the software is encrypted uniquely for each microprocessor and decrypted only inside the microprocessor, encrypted e-mail messages and/or their attachments, encrypted relational database fields, encrypted ad-hoc wireless networks, encryption co-processor chips, encrypted text messages and/or their attachments, encrypted video files, and encrypted web browsers.

An OLE implementation in the CASS authentication system provides many security capabilities. Encrypted data and software in motion can be provided to internal portions of the hardware processor.

An individualized encryption key can be provided for each hardware unit. A security policy may be defined by providing additional authentication variables for each hardware unit. These include processor, computer, phone or modem ID, time of day, personal identity of a user, and the physical location of a user.

Individualized encryption keys may be provided for all users. Individualization may be provided by specifying additional authentication variables for each hardware unit, such as processor, terminal or modem ID, controlled time of usage, controlled hardware usage, or controlled location allowed for usage.

The OLE system has the capability to secure voice, video, or data such as text messages, e-mails, digital files of any type including, communication streams in which data becomes a session key that is used to set up a Virtual Private Network (VPN) session, software and/or firmware into hardware processing platforms, and attachments to any message type.

Capability is provided to group personnel or processors into working groups, tied together with a CASS database management. Removal and addition of personnel/processors is achieved without re-encrypting and distributing data.

Grouped data can be provided. Where the data is secured once for the selected ACL group(s) into a single file or multi-cast, it can be copied to any group member. Each accepted member of the group can be allowed access using the individual client(s) to group association(s) to accept/reject access to the data through control of the session key.

The system may include Detect-Protect-React capability to respond to encryption tampering events. Reactions may include removal of hardware from access to data, removal of personnel (individual clients) from access to data, deletion of encrypted data, providing decryption of a dummy payload, allowing the adversary to think they have cracked the system, and tracking of adversaries with spyware.

Revoking access to secured data can be triggered by notifying CASS that an individual message is to be revoked even after it has been sent.

Security policy is defined by preselected variables embedded into encrypted data as parameters used in authentication. Additional variables can be added later. The CASS system can store standard database reports of authentications, detection of errors, detection of unauthorized access attempts, and automatic policy actions.

I claim:

1. A method for providing key exchange in a communications network using a symmetrical encryption algorithm key, comprising:
   a. providing a transmitter having a selected transmission key KTx;
   b. generating at the transmitter a random symmetric session key K(session);
   c. encrypting a data object with the session key K(session) to provide protected data;
   d. selecting at the transmitter a desired RxID corresponding to an authorized receiver;
   e. establishing RxID as a public identity variable;
   f. selecting message security policy variables;
   g. providing a data structure comprising the desired RxID, the message security policy variables, and session key;
   h. encrypting the data structure with the transmitter key to provide an encrypted data structure;
   i. adding to the encrypted data structure a public ID of the transmitter in plaintext to provide a transmission package including a Header-Tx comprising the desired RxID;
   j. sending the transmission package to a receiver;
   k. providing a data structure Header-Rx including an actual RxID identifying the receiver;
   l encrypting Header-Rx with a receiver key KRx;
   m. storing KRx and KTx at a security server;
   n. sending Header-Tx and Header-Rx to the security server,
   o. selecting KTx as stored at the security server and using KTx to decrypt Header-Tx and accessing desired RxID;
   p. comparing desired RxID to actual RxID;
   q. registering successful authentication if the desired RxID and the actual RxID match;
   r. in response to successful authentication sending session key K(session) to the receiver; and
   s. decrypting the protected data at the receiver using K(session).

2. A method for secure network communication comprising:
   providing a first encryption key KTx and a second encryption key KRx for a transmitter and a receiver respectively;
   storing a copy of the first encryption key KTx and a copy of the second encryption key KRx in an encrypted database in a server, placing each copy in a location accessible by an address corresponding to an identity of a respective transmitter or receiver;
   forming in the transmitter a data structure comprising a header in which a session encryption key K (session), receiver ID, and security information are encrypted by KTx and a secured data object in which data is encrypted with K (session);
   forming a transmitted packet comprising the header and the secure data object;

transmitting the transmitted packet to a receiver;

forming in the receiver a receiver transmitter header and a received secure object data;

forming in the receiver a receiver header comprising a header in which a session encryption key K (session), receiver ID, and security information are encrypted by KRx and a receiver secured data object in which data is encrypted with K (session);

comparing the receiver header and the received transmitter header and producing a signal indicative of authentication or failure of authentication, failure comprising determining that a variable is missing, incomplete, or discrepant from a correct receiver's identity; and in response to a signal indicative of authentication, accessing the receiver key KRx from the encrypted hardware memory, to permit use of K (session) to decrypt the receiver secure data object.

3. A method according to claim 2 wherein the security information comprises message security variables and reaction response codes and further comprising the step of accessing a reaction response code in response to a signal indicative of failure of authentication.

4. A method according to claim 3 wherein the step of providing reaction response codes comprises providing selectable commands each corresponding to a level of response to the failure of authentication.

5. A method according to claim 3 wherein the step of providing reaction response codes comprises providing commands indicative of respective selectable actions.

6. A method according to claim 4 wherein the step of providing reaction response codes further comprises providing commands indicative of respective selectable actions and wherein one said action comprises transmitting data other than the secured data to a transmitter providing incorrect authentication information.

7. A method according to claim 6 comprising assigning a group of clients for authentication as a single entity.

8. A method for secure network communications utilizing object level encryption comprising:

encrypting data at a transmitter with a session encryption key to provide secure object data;

providing a transmitter header comprising a combination of the session encryption key, identity of a target receiver, and message security variables all encrypted with a transmitter encryption key;

forming a packet comprising the header and the secure object data;

transmitting the packet to the target receiver;

creating at the receiver a received transmitter header indicative of the transmitted header and a received transmitter secure object data;

providing at the target receiver a receiver heading comprising receiver identity and receiver security variables encrypted with a receiver encryption key;

verifying correspondence of security variables in said received transmitter heading and said receiver transmitter heading;

in response to verification, utilizing the receiver identity provided in the transmitter header to access a stored receiver encryption key; and providing the receiver encryption key for use by the receiver for decrypting the received secure data.

9. A method according to claim 8 wherein the step of providing the receiver encryption key for decrypting received secure data comprises accessing the receiver security key and utilizing the receiver encryption key to decrypt a data structure comprising the session security key and security variables, and decrypting the received transmitter secure object data.

10. A method according to claim 9 further comprising providing reaction codes and accessing a reaction code in response to the failure of authentication.

11. A method according to claim 10 further comprising controlling a data package after the data package has been delivered to a receiver by assigning a data ID number to the transmitter header, associating a code with the data ID number, sending a command from the transmitter to the server to revoke the message and storing the command at the server to command failure of authentication in response to a request to authenticate a data package corresponding to the data ID number.

12. A method according to claim 11 wherein security codes comprise selective variables indicative of values and names of parameters associated with the transmitter.

* * * * *